(12) United States Patent
Sabiston et al.

(10) Patent No.: US 8,576,250 B2
(45) Date of Patent: Nov. 5, 2013

(54) METHOD, APPARATUS, MEDIA, AND SIGNALS FOR APPLYING A SHAPE TRANSFORMATION TO A THREE DIMENSIONAL REPRESENTATION

(75) Inventors: Robert Malcolm Sabiston, Vancouver (CA); Jeffrey David Chang, Vancouver (CA); Christopher Cameron Handford, Vancouver (CA)

(73) Assignee: Vorum Research Corporation (CA)

( * ) Notice: Subject to any disclaimer, the term of this patent is extended or adjusted under 35 U.S.C. 154(b) by 674 days.

(21) Appl. No.: 12/739,381

(22) PCT Filed: Oct. 24, 2007

(86) PCT No.: PCT/CA2007/001884
§ 371 (c)(1),
(2), (4) Date: Apr. 22, 2010

(87) PCT Pub. No.: WO2009/052602
PCT Pub. Date: Apr. 30, 2009

(65) Prior Publication Data
US 2011/0134123 A1    Jun. 9, 2011

(51) Int. Cl.
*G09G 5/00*    (2006.01)
(52) U.S. Cl.
USPC ........................................ 345/646
(58) Field of Classification Search
None
See application file for complete search history.

(56) References Cited

U.S. PATENT DOCUMENTS

| | | |
|---|---|---|
| 4,430,718 A | 2/1984 | Hendren |
| 4,436,684 A | 3/1984 | White |
| 4,575,805 A | 3/1986 | Moermann et al. |
| 4,629,409 A | 12/1986 | Satoh et al. |
| 4,663,720 A | 5/1987 | Duret et al. |
| 4,912,644 A | 3/1990 | Aoyama et al. |

(Continued)

FOREIGN PATENT DOCUMENTS

| | | |
|---|---|---|
| CA | 2 095 238 | 5/1992 |
| CA | 2 277 093 | 7/1998 |

(Continued)

OTHER PUBLICATIONS

Vannier et al., Visualization of Prosthesis Fit in Lower-Limb Amputees, Oct. 1997, IEEE Computer Graphics and Applications, vol. 17, No. 5, pp. 16-29.*

(Continued)

*Primary Examiner* — Daniel Hajnik
*Assistant Examiner* — Anh-Tuan V Nguyen
(74) *Attorney, Agent, or Firm* — Kolisch Hartwell, P.C.

(57) ABSTRACT

A method, apparatus, media and signals for applying a shape transformation to at least a portion of a three dimensional representation of an appliance for a living body is disclosed. The representation is defined by an input plurality of coordinates representing a general shape of the appliance. The method involves identifying a coordinate location of a datum plane with respect to the representation of the appliance, the datum plane defining a transform volume within which the shape transformation is to be applied, the transform volume extending outwardly from and normal to a first surface of the datum plane. The method also involves identifying input coordinates in the plurality of input coordinates that are located within the transform volume. The method further involves modifying the identified input coordinates in accordance with the shape transformation to produce a modified representation of the appliance, and storing the modified representation of the appliance in a computer memory.

28 Claims, 12 Drawing Sheets

(56) References Cited

U.S. PATENT DOCUMENTS

| | | | |
|---|---|---|---|
| 5,056,204 | A | 10/1991 | Bartschi |
| 5,224,049 | A | 6/1993 | Mushabac |
| 5,360,446 | A | 11/1994 | Kennedy |
| 5,452,219 | A | 9/1995 | Dehoff et al. |
| 5,475,613 | A | 12/1995 | Itoga et al. |
| 5,506,785 | A | 4/1996 | Blank et al. |
| 5,510,066 | A | 4/1996 | Fink et al. |
| 5,539,649 | A | 7/1996 | Walsh et al. |
| 5,543,103 | A | 8/1996 | Hogan et al. |
| 5,742,511 | A | 4/1998 | Chasse et al. |
| 5,778,177 | A | 7/1998 | Azar |
| 6,108,006 | A | 8/2000 | Hoppe |
| 6,212,441 | B1 | 4/2001 | Hazama et al. |
| 6,389,375 | B1 | 5/2002 | Thomsen et al. |
| 6,463,351 | B1* | 10/2002 | Clynch ................. 700/163 |
| 6,473,667 | B1 | 10/2002 | Lee |
| 6,701,200 | B1 | 3/2004 | Lukis et al. |
| 6,772,026 | B2 | 8/2004 | Bradbury et al. |
| 6,839,607 | B2 | 1/2005 | Wooten |
| 6,920,414 | B2 | 7/2005 | Topholm |
| 6,982,710 | B2 | 1/2006 | Salomie |
| 7,134,874 | B2 | 11/2006 | Chishti et al. |
| 7,167,189 | B2 | 1/2007 | Di Lelle et al. |
| 7,221,380 | B2* | 5/2007 | Hunter et al. ............. 345/648 |
| 7,299,101 | B2 | 11/2007 | Lukis et al. |
| 7,435,083 | B2 | 10/2008 | Chishti et al. |
| 8,116,900 | B2 | 2/2012 | Slemker et al. |
| 2001/0000805 | A1 | 5/2001 | Kadono |
| 2001/0002232 | A1 | 5/2001 | Young et al. |
| 2001/0002310 | A1 | 5/2001 | Chishti et al. |
| 2001/0025203 | A1 | 9/2001 | Gervasi |
| 2002/0013636 | A1 | 1/2002 | O'Brien et al. |
| 2002/0149137 | A1 | 10/2002 | Jang et al. |
| 2003/0195623 | A1 | 10/2003 | Marchitto et al. |
| 2003/0204279 | A1 | 10/2003 | Yokohari et al. |
| 2003/0206820 | A1 | 11/2003 | Keicher et al. |
| 2004/0068337 | A1 | 4/2004 | Watson et al. |
| 2004/0085311 | A1* | 5/2004 | Lee et al. .............. 345/419 |
| 2005/0043837 | A1 | 2/2005 | Rubbert et al. |
| 2005/0089213 | A1 | 4/2005 | Geng |
| 2005/0089822 | A1 | 4/2005 | Geng |
| 2005/0119777 | A1 | 6/2005 | Arbogast et al. |
| 2005/0286798 | A1 | 12/2005 | Pollard et al. |
| 2006/0094951 | A1 | 5/2006 | Dean et al. |
| 2006/0100832 | A1 | 5/2006 | Bowman |
| 2006/0203010 | A1 | 9/2006 | Kirchner et al. |
| 2006/0286501 | A1 | 12/2006 | Chishti et al. |
| 2007/0118243 | A1 | 5/2007 | Schroeder et al. |
| 2009/0248184 | A1 | 10/2009 | Steingart et al. |
| 2009/0306801 | A1 | 12/2009 | Sivak et al. |

FOREIGN PATENT DOCUMENTS

| | | |
|---|---|---|
| CA | 2 405 738 | 10/2001 |
| EP | 1 273 876 A2 | 1/2003 |
| FR | 2 855 959 | 12/2004 |
| FR | 2 885 518 | 11/2006 |
| GB | 2 266 214 A | 10/1993 |
| GB | 2 266 214 B | 10/1996 |
| WO | 89/11257 | 11/1989 |
| WO | 97/18533 | 5/1997 |
| WO | 2004/100045 A1 | 11/2004 |
| WO | 2006/110895 A2 | 10/2006 |
| WO | 2009/015455 A1 | 2/2009 |

OTHER PUBLICATIONS

International Search Report dated Apr. 17, 2008 in connection with related International Application No. PCT/CA2007/001337, 2 pgs.

International Search Report and Written Opinion dated Jul. 11, 2008 in connection with related International Application No. PCT/CA2007/001884, 6 pgs.

International Search Report and Written Opinion dated Dec. 9, 2009 in connection with related International Application No. PCT/CA2009/000417, 9 pgs.

Kurt Oberg et al., "The CAPOD System—A Scandinavian CAD/CAM System for Prosthetic Sockets", Journal of Prosthetics and Orthotics, vol. 1, No. 3, (1989) pp. 139-148.

Kimberly Jensen Nielsen, "Bio-Surfaces and Geometric References for a Standardized Biomechanical Design Methodology for Mass Customization", Dissertation submitted to Department of Mechanical Engineering, Brigham Young University, Apr. 2008, pp. 1-185.

P. He and K. Xue, "A PC-Based Ultrasound Scanning System for Imaging a Residual Limb", Proceedings of the 16th Annual International Conference of the IEEE Engineering in Medicine and Biology Society, (1994), vol. 1, Baltimore, MD, Nov. 3-6, 1994, pp. 480-481.

A.L. Darling and W. Sun, "Orthotic design through 3D reconstruction: A passive-assistance ankle-foot orthotic", Applied Bionics and Biomechanics, Cambridge, Woodhead Publishing Ltd., vol. 3, No. 2, Jan. 1, 2006, pp. 93-99.

Vorum Research Corporation, "Canfit-Plustm P&O Design", posted on the internet on Oct. 15, 2006 and accessed Jun. 19, 2008 at http://web.archive.org/web/20061015183514/www.vorum.com/P&O_System/prod_P&OSystem_P&O_Design.asp?pageID=28, 2 pgs.

European Patent Office, Supplementary European Search Report and Written Opinion dated Mar. 26, 2012 in connection with related Application No. EP-21047017, 6 pgs.

Harvey et al., "A Review of CAD/CAM Procedures for the Production of Custom Made Artificial Hip Joints", IEEE, 1989, pp. 1938-1939.

Phillip J. Schneider et al., "Geometric Tools for Computer Graphics", pp. 139, 140 and 142, published Sep. 2002.

Chantal Hebert, Authorized Officer, Canadian Intellectual Property Office, "International Search Report" in connection with related PCT Application Serial No. PCT/CA2008/001362, dated Apr. 9, 2009, 3 pages.

Chantal Hebert, Authorized Officer, Canadian Intellectual Property Office, "Written Opinion of the International Searching Authority" in connection with related PCT Application Serial No. PCT/CA2008/001362, dated Apr. 9, 2009, 8 pages.

* cited by examiner

METHOD, APPARATUS, MEDIA, AND SIGNALS FOR APPLYING A SHAPE TRANSFORMATION TO A THREE DIMENSIONAL REPRESENTATION

BACKGROUND OF THE INVENTION

1. Field of Invention

This invention relates generally to three-dimensional shape representations and more particularly to applying a shape transformation to a representation of an appliance for a living body.

2. Description of Related Art

Prostheses and orthoses are commonly produced from three-dimensional representations of a body part of a human or an animal. The three-dimensional representation may then be manipulated on a computer using a three dimensional (3D) shape editing program to produce a modified representation of the body part. The modified representation may be used to generate instructions for controlling a carving machine that is configured to directly produce a prosthesis appliance from wood, or to produce a polyurethane mold for making an orthosis appliance, for example. An orthosis is an appliance that is applied externally to a body part to correct deformity, improve function, or relieve symptoms of a disease by supporting or assisting the musculo-neuro-skeletal system. A prosthesis is an appliance that replaces a missing body part.

The three-dimensional representation of the body part may be produced using a non-contact optical scanner that images the body part with a high level of accuracy. The scanner may include a laser for illuminating the body part with structured light and a video camera for capturing images of the illuminated body part. The captured images may then be processed to extract three-dimensional coordinates of the surface of the body part, which may be used in turn to produce the appliance.

SUMMARY OF THE INVENTION

Accordingly, the inventors have identified a need for modifying the three-dimensional representation, or a portion thereof, prior to producing the appliance. For example, where the appliance is an orthosis, it may be desirable to lengthen a portion of the foot to adapt the appliance for a patient having a larger shoe size. Other modifications may also be desired to provide a more comfortable fit to the patient, for example.

In accordance with one aspect of the invention there is provided a method for applying a shape transformation to at least a portion of a three dimensional representation of an appliance for a living body, the representation being defined by an input plurality of coordinates representing a general shape of the appliance. The method involves identifying a coordinate location of a datum plane with respect to the representation of the appliance, the datum plane defining a transform volume within which the shape transformation is to be applied, the transform volume extending outwardly from and normal to a first surface of the datum plane. The method also involves identifying input coordinates in the plurality of input coordinates that are located within the transform volume. The method further involves modifying the identified input coordinates in accordance with the shape transformation to produce a modified representation of the appliance, and storing the modified representation of the appliance in a computer memory.

Identifying the coordinate location of the datum plane may involve identifying a coordinate location that causes the datum plane to intersect the representation of the appliance such that the modified representation of the appliance includes a modified portion within the transform volume, and an unmodified portion outside the transform volume.

Modifying the identified input coordinates in accordance with the shape transformation may involve scaling the identified input coordinates in a direction normal to the first surface of the datum plane.

The method may involve identifying a location of at least one constraint plane, the at least one constraint plane being perpendicular to the datum plane and operable to limit an extent of the transform volume in a direction normal to the constraint plane.

Identifying the location of the at least one constraint plane may involve identifying respective locations of at least two constraint planes, each respective constraint plane being perpendicular to the datum plane, the respective constraint planes being orthogonally located with respect to each other.

Identifying the coordinate location of the constraint plane may involve identifying a coordinate location to cause the constraint plane to intersect the representation of the appliance such that the modified representation of the appliance includes a modified portion within the transform volume and an unmodified portion outside the transform volume.

The method may involve identifying a blending region in the transform volume proximate the constraint plane, and altering a shape transform magnitude in the blending region to cause continuity of shape between the modified portion and the unmodified portion of the modified representation of the appliance.

Modifying the identified input coordinates in accordance with the shape transformation may involve scaling the identified input coordinates in a direction normal to the first surface of the datum plane and altering the shape transform magnitude may involve applying a plurality of different scaling magnitudes to identified input coordinates in the blending region such that input coordinates in the blending region located proximate the constraint plane may be scaled less than input coordinates in the blending region that may be located distal to the constraint plane.

The method may involve identifying a location of a limit plane, the limit plane being located in the transform volume and being parallel to the datum plane, the limit plane being operable to limit an extent of the transform volume in a direction normal to the datum plane.

Identifying the coordinate location of the limit plane may involve identifying a coordinate location to cause the limit plane to intersect the representation of the appliance such that the modified representation of the appliance includes a modified portion within the transform volume, and an unmodified portion outside the transform volume, and may further involve identifying input coordinates in the plurality of input coordinates representing portions of the appliance located beyond the limit plane, and causing the identified input coordinates to be translated in a direction normal to the datum plane such that the modified portion of the representation and the unmodified portion of the representation of the appliance on either side of the limit plane remain contiguously located after the modifying.

Identifying the coordinate location of the datum plane may involve identifying the coordinate location of the datum plane in response to receiving first user input.

The method may involve displaying the representation of the appliance and the datum plane on a computer display.

The method may involve interactively repositioning the datum plane on the computer display in response to receiving second user input representing a desired change in the coordinate location of the datum plane.

Interactively repositioning the datum plane may involve repositioning the datum plane in response to user input representing at least one of a desired change to a pitch of the datum plane, a desired change to a roll of the datum plane, a desired change to a yaw of the datum plane, and a desired translation of the datum plane.

Modifying the identified input coordinates may involve generating a transform matrix representing the shape transform, and multiplying each identified input coordinate by the transform matrix to produce modified input coordinates representing the modified representation of the appliance.

The method may involve receiving the input plurality of points.

Receiving the input plurality of points may involve receiving a plurality of points from a three-dimensional surface scanner, the plurality of points representing at least one surface of the living body for which the appliance may be intended.

The method may involve transforming the modified representation of the appliance into a set of instructions operable to control a computer aided manufacturing machine to produce the appliance.

In accordance with another aspect of the invention there is provided an apparatus for applying a shape transformation to at least a portion of a three dimensional representation of an appliance for a living body, the representation being defined by an input plurality of coordinates representing a general shape of the appliance. The apparatus includes provisions for identifying a coordinate location of a datum plane with respect to the representation of the appliance, the datum plane defining a transform volume within which the shape transformation is to be applied, the transform volume extending outwardly from and normal to a first surface of the datum plane. The apparatus also includes provisions for identifying input coordinates in the plurality of input coordinates that are located within the transform volume. The apparatus further includes provisions for modifying the identified input coordinates in accordance with the shape transformation to produce a modified representation of the appliance, and provisions for storing the modified representation of the appliance in a computer memory.

The provisions for identifying the coordinate location of the datum plane may include provisions for identifying a coordinate location that causes the datum plane to intersect the representation of the appliance such that the modified representation of the appliance includes a modified portion within the transform volume, and an unmodified portion outside the transform volume.

The provisions for modifying the identified input coordinates in accordance with the shape transformation may include provisions for scaling the identified input coordinates in a direction normal to the first surface of the datum plane.

The apparatus may include provisions for identifying a location of at least one constraint plane, the at least one constraint plane being perpendicular to the datum plane and operable to limit an extent of the transform volume in a direction normal to the constraint plane.

The provisions for identifying the location of the at least one constraint plane may include provisions for identifying respective locations of at least two constraint planes, each respective constraint plane being perpendicular to the datum plane, the respective constraint planes being orthogonally located with respect to each other.

The provisions for identifying the coordinate location of the constraint plane may include provisions for identifying a coordinate location to cause the constraint plane to intersect the representation of the appliance such that the modified representation of the appliance includes a modified portion within the transform volume and an unmodified portion outside the transform volume.

The apparatus may include provisions for identifying a blending region in the transform volume proximate the constraint plane, and provisions for altering a shape transform magnitude in the blending region to cause continuity of shape between the modified portion and the unmodified portion of the modified representation of the appliance.

The provisions for modifying the identified input coordinates in accordance with the shape transformation may include provisions for scaling the identified input coordinates in a direction normal to the first surface of the datum plane and the provisions for altering the transform magnitude in the blending region may include provisions for applying a plurality of different scaling magnitudes to identified input coordinates in the blending region such that input coordinates in the blending region located proximate the constraint plane may be scaled less than input coordinates in the blending region that may be located distal to the constraint plane.

The apparatus may include provisions for identifying a location of a limit plane, the limit plane being located in the transform volume and being parallel to the datum plane, the limit plane being operable to limit an extent of the transform volume in a direction normal to the datum plane.

The provisions for identifying the coordinate location of the limit plane may include provisions for identifying a coordinate location to cause the limit plane to intersect the representation of the appliance such that the modified representation of the appliance includes a modified portion within the transform volume and an unmodified portion outside the transform volume, and may further include provisions for identifying input coordinates in the plurality of input coordinates representing portions of the appliance located beyond the limit plane, and provisions for causing the identified input coordinates to be translated in a direction normal to the datum plane such that the modified portion of the representation and the unmodified portion of the representation of the appliance on either side of the limit plane remain contiguously located after the modifying.

The provisions for identifying the coordinate location of the datum plane may include provisions for identifying the coordinate location of the datum plane in response to receiving first user input.

The apparatus may include provisions for displaying the representation of the appliance and the datum plane.

The apparatus may include provisions for interactively repositioning the datum plane on the provisions for displaying in response to receiving second user input representing a desired change in the coordinate location of the datum plane.

The provisions for interactively repositioning the datum plane may include provisions for repositioning the datum plane in response to user input representing at least one of a desired change to a pitch of the datum plane, a desired change to a roll of the datum plane, a desired change to a yaw of the datum plane, and a desired translation of the datum plane.

The provisions for modifying the identified input coordinates may include provisions for generating a transform matrix representing the shape transform, and provisions for multiplying each identified input coordinate by the transform matrix to produce modified input coordinates representing the modified representation of the appliance.

The apparatus may include provisions for receiving the input plurality of points.

Receiving the input plurality of points may include provisions for receiving a plurality of points from a three-dimensional surface scanner, the plurality of points representing at least one surface of the living body for which the appliance may be intended.

The apparatus may include provisions for transforming the modified representation of the appliance into a set of instructions operable to control a computer aided manufacturing machine to produce the appliance.

In accordance with another aspect of the invention there is provided an apparatus for applying a shape transformation to at least a portion of a three dimensional representation of an appliance for a living body, the representation being defined by an input plurality of coordinates representing a general shape of the appliance. The apparatus includes a processor circuit operably configured to identify a coordinate location of a datum plane with respect to the representation of the appliance, the datum plane defining a transform volume within which the shape transformation is to be applied, the transform volume extending outwardly from and normal to a first surface of the datum plane. The processor circuit is also operably configured to identify input coordinates in the plurality of input coordinates that are located within the transform volume. The processor circuit is further operably configured to modify the identified input coordinates in accordance with the shape transformation to produce a modified representation of the appliance, and store the modified representation of the appliance in a computer memory.

The processor circuit may be operably configured to identify a coordinate location that causes the datum plane to intersect the representation of the appliance such that the modified representation of the appliance includes a modified portion within the transform volume, and an unmodified portion outside the transform volume.

The processor circuit may be operably configured to modify the identified input coordinates in accordance with the shape transformation by scaling the identified input coordinates in a direction normal to the first surface of the datum plane.

The processor circuit may be operably configured to identify a location of at least one constraint plane, the at least one constraint plane being perpendicular to the datum plane and operable to limit an extent of the transform volume in a direction normal to the constraint plane.

The processor circuit may be operably configured to identify the location of the at least one constraint plane may include by identifying respective locations of at least two constraint planes, each respective constraint plane being perpendicular to the datum plane, the respective constraint planes being orthogonally located with respect to each other.

The processor circuit may be operably configured to identify the coordinate location of the constraint plane by identifying a coordinate location to cause the constraint plane to intersect the representation of the appliance such that the modified representation of the appliance includes a modified portion within the transform volume and an unmodified portion outside the transform volume.

The processor circuit may be operably configured to identify a blending region in the transform volume proximate the constraint plane, and alter a shape transform magnitude in the blending region to cause continuity of shape between the modified portion and the unmodified portion of the modified representation of the appliance.

The processor circuit may be operably configured to modify the identified input coordinates in accordance with the shape transformation by scaling the identified input coordinates in a direction normal to the first surface of the datum plane and the processor circuit may be operably configured to alter the transform magnitude in the blending region by applying a plurality of different scaling magnitudes to identified input coordinates in the blending region such that input coordinates in the blending region located proximate the constraint plane may be scaled less than input coordinates in the blending region that may be located distal to the constraint plane.

The processor circuit may be operably configured to identify a location of a limit plane, the limit plane being located in the transform volume and being parallel to the datum plane, the limit plane being operable to limit an extent of the transform volume in a direction normal to the datum plane.

The processor circuit may be operably configured to identify the coordinate location of the limit plane by identifying a coordinate location to cause the limit plane to intersect the representation of the appliance such that the modified representation of the appliance includes a modified portion within the transform volume and an unmodified portion outside the transform volume, and the processor circuit may be further operably configured to identify input coordinates in the plurality of input coordinates representing portions of the appliance located beyond the limit plane, and cause the identified input coordinates to be translated in a direction normal to the datum plane such that the modified portion of the representation and the unmodified portion of the representation of the appliance on either side of the limit plane remain contiguously located after the modifying.

The processor circuit may be operably configured to identify the coordinate location of the datum plane by identifying the coordinate location of the datum plane in response to receiving first user input.

The processor circuit may be operably configured to display the representation of the appliance and the datum plane.

The processor circuit may be operably configured to interactively reposition the datum plane on the provisions for displaying in response to receiving second user input representing a desired change in the coordinate location of the datum plane.

The processor circuit may be operably configured to interactively reposition the datum plane by repositioning the datum plane in response to user input representing at least one of a desired change to a pitch of the datum plane, a desired change to a roll of the datum plane, a desired change to a yaw of the datum plane, and a desired translation of the datum plane.

The processor circuit may be operably configured to modify the identified input coordinates by generating a transform matrix representing the shape transform, and multiplying each identified input coordinate by the transform matrix to produce modified input coordinates representing the modified representation of the appliance.

The processor circuit may be operably configured to receive the input plurality of points.

The processor circuit may be operably configured to receive the input plurality of points by receiving a plurality of points from a three-dimensional surface scanner, the plurality of points representing at least one surface of the living body for which the appliance may be intended.

The processor circuit may be operably configured to transform the modified representation of the appliance into a set of instructions operable to control a computer aided manufacturing machine to produce the appliance.

In accordance with another aspect of the invention there is provided a computer readable medium encoded with codes for directing a processor circuit to apply a shape transformation to at least a portion of a three dimensional representation of an appliance for a living body, the representation being defined by an input plurality of coordinates representing a general shape of the appliance. The codes direct the processor circuit to identify a coordinate location of a datum plane with respect to the representation of the appliance, the datum plane defining a transform volume within which the shape transformation is to be applied, the transform volume extending outwardly from and normal to a first surface of the datum plane. The codes also direct the processor circuit to identify input coordinates in the plurality of input coordinates that are located within the transform volume. The codes further direct the processor circuit to modify the identified input coordinates in accordance with the shape transformation to produce a modified representation of the appliance, and store the modified representation of the appliance in a computer memory.

In accordance with another aspect of the invention there is provided a computer readable signal encoded with codes for directing a processor circuit to apply a shape transformation to at least a portion of a three dimensional representation of an appliance for a living body, the representation being defined by an input plurality of coordinates representing a general shape of the appliance. The codes direct the processor circuit to identify a coordinate location of a datum plane with respect to the representation of the appliance, the datum plane defining a transform volume within which the shape transformation is to be applied, the transform volume extending outwardly from and normal to a first surface of the datum plane. The codes also direct the processor circuit to identify input coordinates in the plurality of input coordinates that are located within the transform volume. The codes further direct the processor circuit to modify the identified input coordinates in accordance with the shape transformation to produce a modified representation of the appliance, and store the modified representation of the appliance in a computer memory.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
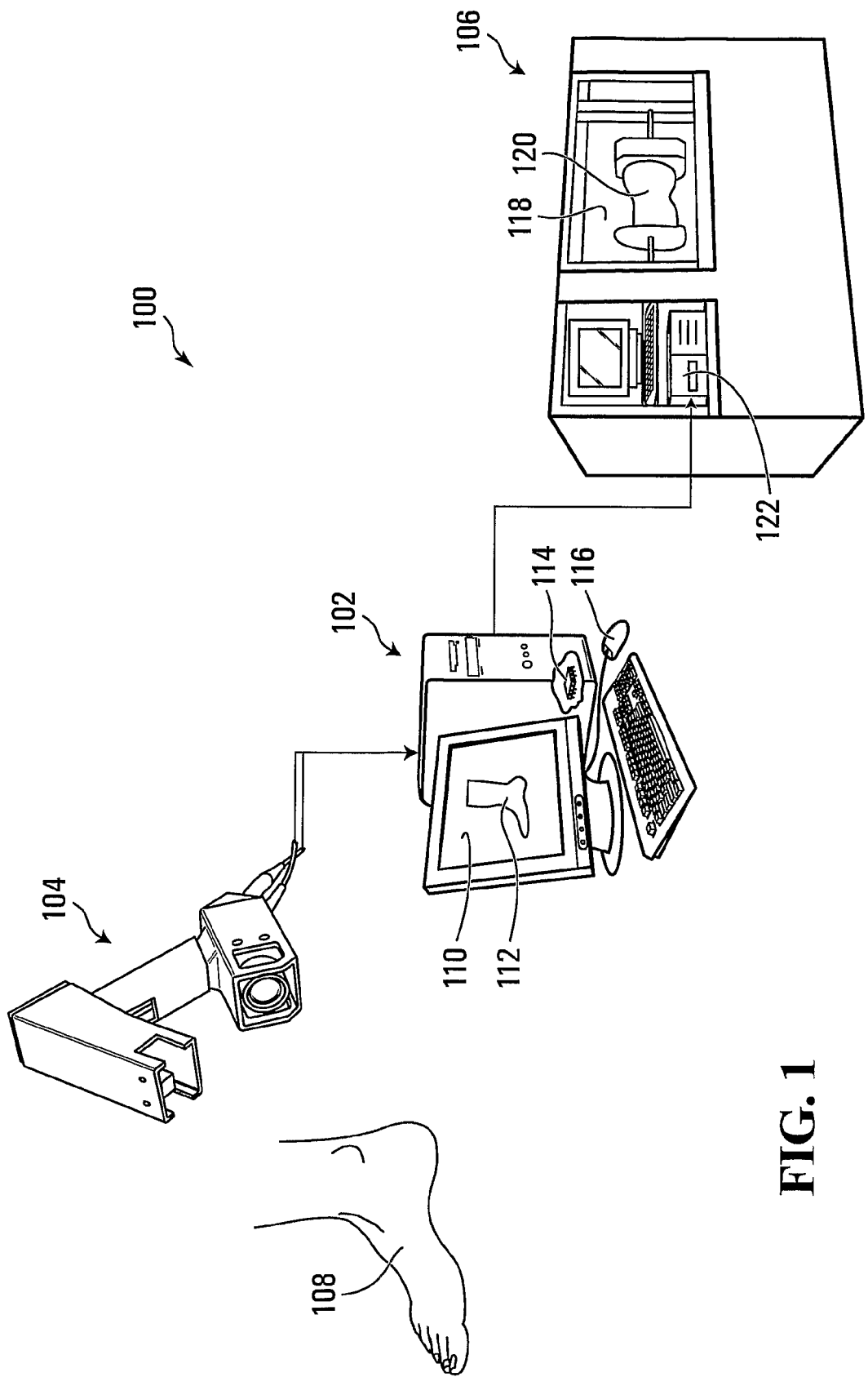
FIG. 1 is a schematic view of a system for producing an appliance for a living body.

Referring to FIG. 1, a CAD/CAM (computer aided design/computer aided manufacturing) system for producing an appliance for a living body is shown generally at 100. The system 100 includes a CAD apparatus 102 for applying a shape transformation to at least a portion of a representation of the appliance. The system 100 also includes a scanner 104, and a computer aided manufacturing (CAM) machine 106.

The apparatus 102 is in communication with the scanner 104 for receiving a signal encoded with an input plurality of coordinates representing a general shape of a part of a living body for which the appliance is to be produced. In the embodiment shown in FIG. 1, the body part is a lower limb 108 of a human patient, but in other embodiments the body part may be any part of a living body. Examples of suitable scanners include the FastSCAN Cobra handheld scanner manufactured by Polhemus of Colchester, Vt., the Yeti Foot Scanner manufactured by Vorum Research Corporation of British Columbia, Canada, and the STARscanner™ manufactured by Orthomerica Products Inc. of California.

The apparatus 102 further includes a display 110 for displaying a three dimensional representation 112 of the limb 108, and a processor circuit 114 for manipulating the input plurality of coordinates and/or the displayed representation of the limb. In this embodiment the apparatus 102 also includes a pointing device 116 having one or more actuator buttons for receiving user input from a user of the apparatus.

In general, when producing an appliance such as a prosthesis or orthosis, the input plurality of coordinates from the scanner 104 may be used as a starting point to which modifications are made using the CAD apparatus 102 to produce a modified representation of the appliance. The modified representation may include alterations to the shape of surfaces, such as compressions in areas of the body that tolerate pressure and/or relief in certain areas of the body that are sensitive to pressure, thus providing a comfortably fitting appliance as defined by the modified representation.

The CAM machine 106 generally includes a machine tool portion 118 for machining the appliance 120 from a material such as polyurethane foam or wood, for example. The machined appliance 120 has a shape defined by the modified representation of the appliance and generally corresponds to the shape of the body part, with alterations for fit, comfort, and/or support. The machined appliance 120 may be used directly as a prosthetic appliance. Alternatively, the machined appliance 120 may be used to mold a final appliance such as an orthosis, by molding a thermoplastic or other material over the machined appliance.

The CAM machine 106 also includes a controller 122 for controlling the machine tool portion 118 of the CAM machine. The controller 122 is in communication with the apparatus 102 for receiving a signal encoded with instructions operable to control the CAM machine 106 to produce the machined appliance 120. An example of a suitable CAM machine is the CANFIT-PLUS™ Carver produced by Vorum Research Corporation of British Columbia, Canada.

Processor Circuit

Figure 2:
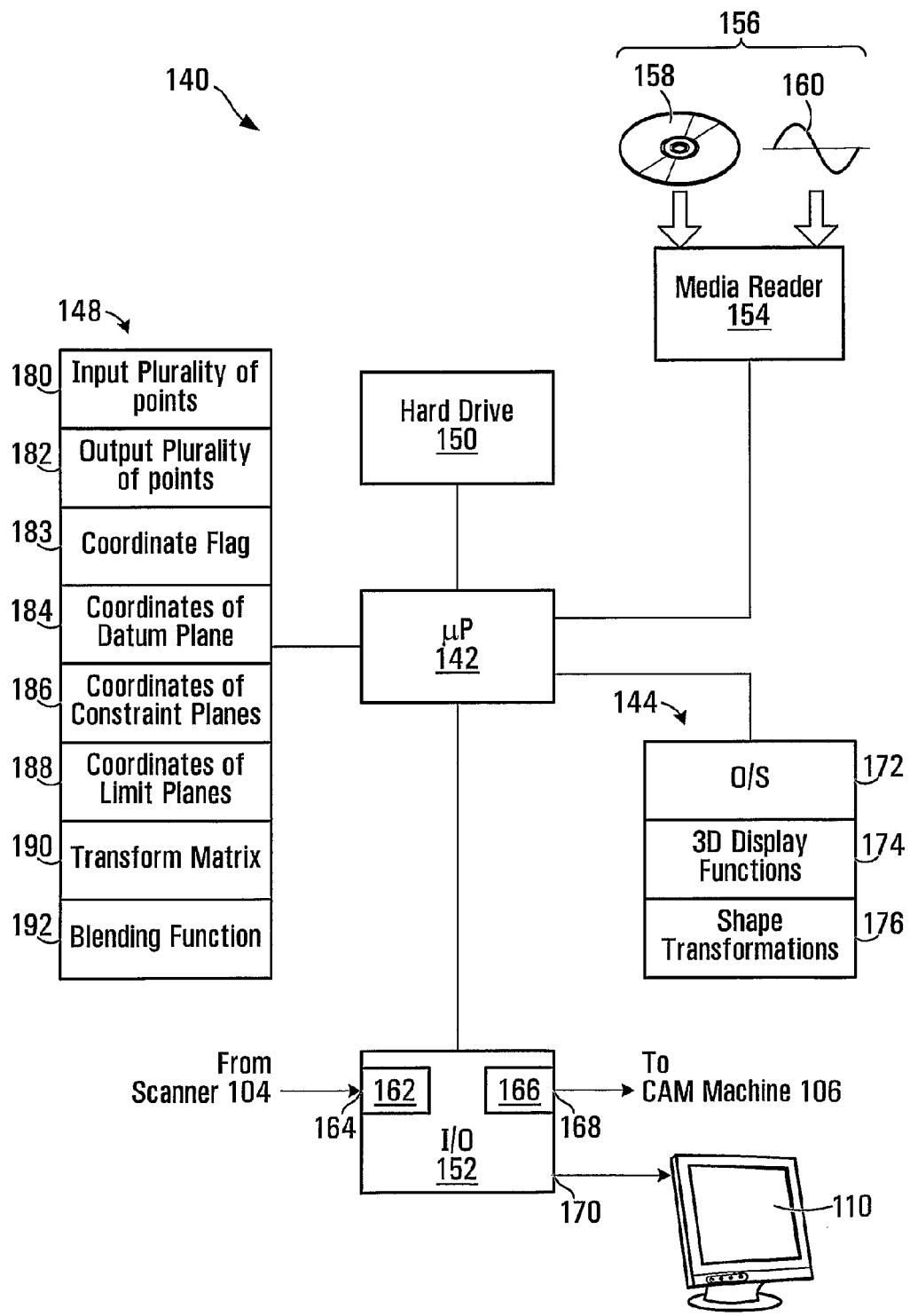
FIG. 2 is a schematic view of a processor circuit for implementing an apparatus for applying a shape transformation to at least a portion of a representation of the appliance.

The processor circuit 114 of the apparatus 102 is shown in greater detail in FIG. 2 at 140. Referring to FIG. 2, the processor circuit 140 includes a microprocessor 142, a program memory 144, a random access memory (RAM) 148, a hard drive 150, an input output port (I/O) 152, and a media reader 154, all of which are in communication with the microprocessor 142.

Program codes for directing the microprocessor 142 to carry out various functions are stored in the program memory 144, which may be implemented as a random access memory (RAM) and/or a hard disk drive (HDD), or a combination thereof. The program memory 144 includes a block of codes 172 for directing the microprocessor to provide general operating system (O/S) functions, and a block of codes 174 for directing the microprocessor 142 to provide functions to display a 3D view of the representation of the limb 108 on the display 110. The program memory 144 also includes a block of codes 176 for directing the microprocessor 142 to provide shape transformation functions for applying a shape transformation to at least a portion of the representation of the appliance.

The media reader 154 facilitates loading program codes into the program memory 144 from a computer readable medium 156, such as a CD ROM disk 158, or a computer readable signal 160, such as may be received over a network such as the internet, for example.

The RAM 148 includes a plurality of storage locations including a store 180 for storing the input plurality of coordinates representing a general shape of the appliance (for example the limb 108). The RAM 148 also includes a store 182 for storing an output plurality of points representing a modified representation of the appliance. The RAM 148 also includes a store 183 for storing a Boolean array of flags, having elements corresponding to the input coordinates. The RAM 148 further includes stores 184, 186, and 188 for storing coordinates identifying a datum plane, constraint planes, and limit planes respectively. The RAM 148 also includes a store 192 for storing a shape transform matrix, and a store 192 for storing blending function coefficients and parameters.

The I/O 152 includes a first interface 162 having an input 164 for receiving the signal encoded with the input plurality of points representing the shape of the limb 108, and a second interface 166 having an output 168 for producing the signal encoded with the instructions for controlling the CAM machine 106 to produce the appliance. The interfaces 162 and 166 may be universal serial bus (USB) or an RS232 serial interface for example. The I/O 152 also includes an output 170 for producing a display signal for causing a representation of the limb 108 to be displayed on the display 110.

Coordinate Representation of the Appliance

The scanner 104 shown in FIG. 1 may be configured to produce coordinates representing the limb 108 in any one of a plurality of existing data formats for representing surfaces of 3D objects.

Figure 3:
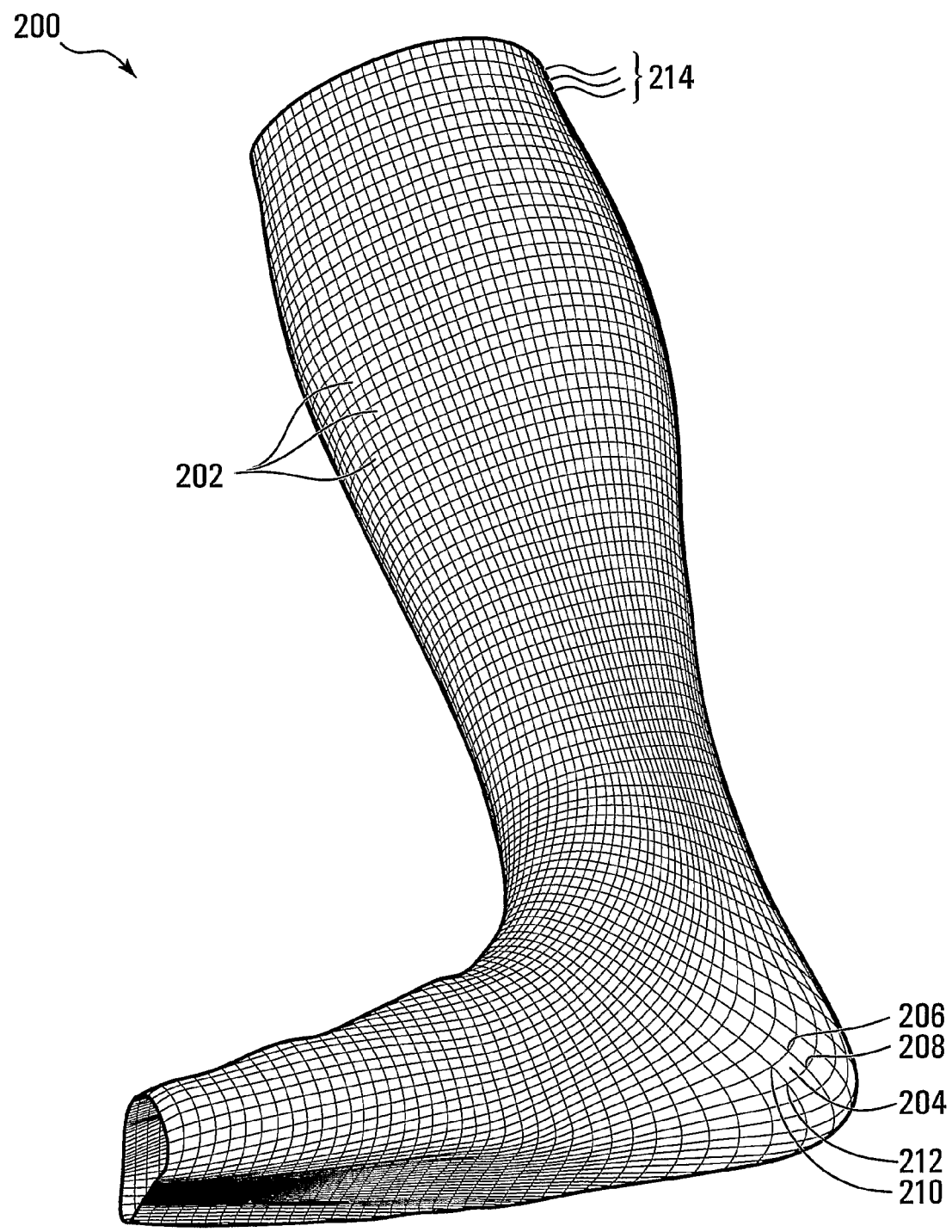
FIG. 3 is a front perspective view of an exemplary polygon mesh representation of a limb.

Referring to FIG. 3, in an exemplary embodiment, a surface of the limb 108 is represented by a generally tubular polygon mesh 200 having a plurality of quadrilateral polygons 202, each polygon thus being defined by four vertices having respective (x,y,z) coordinates. The polygon mesh 200 includes m rows 214 of vertexes, where the vertexes are defined such that each row includes n entries. The vertices in each row are co-planar and may be stored an m×n array in the store 180 of the RAM 148 (shown in FIG. 2). Respective vertices in each row 214 are also contiguously located and as such, each quadrilateral polygon 202 in the mesh will be represented by vertices V(j,k), V(j,k+1), V(j+1,k) and V(j+1,k+1). For example, a polygon 204 is defined by a first vertex 206 (V(j,k)), a second vertex 208 (V(j,k+1)), a third vertex 210 (V(j+1,k)), and a fourth vertex 212 (V(j+1,k+1)). Additionally, since in this embodiment the polygon mesh 200 is tubular (and thus wraps around on itself), a final polygon in a row j will have vertices V(j,n), V(j,0), V(j+1,n) and V(j+1,0). Advantageously, in this exemplary embodiment, the connections between vertices is implicit in the m×n array data structure once the mesh dimensions have been selected, and it is thus not necessary to store additional connectivity information.

The polygon mesh 200 may be produced from data produced by the scanner 104. Depending on the format of the data produced by the scanner 104, the data may be resampled to produce the tubular polygon mesh 200 shown in FIG. 3.

In other embodiments the polygon mesh representing the shape of the limb 108 may be rectangular or otherwise shaped, or the mesh may be stored as an un-ordered set of vertices along with connectivity information. For example, an exemplary data structure for storing the vertices and identifying the polygons may include a first array of vertices (V1 (x1, y1, z1), V2(x2, y2, z2) . . . etc) and a second array defining which vertices make up each polygon (P1=(V1, V2, V3, V4)), P2=(V3, V4, V5, V6) . . . etc).

In this embodiment, the data representation is ordered in a plurality of planes or slices 214. Each plane 214 includes a plurality of co-planar vertices, and (x,y,z) coordinates of the points making up each plane may be stored as a row in a data array of at least two dimensions (not shown). Subsequent planes may be represented as successive rows in the data array. In the embodiment shown in FIG. 3, planes 214 are generally parallel to each other while other planes, such as planes 216, may be disposed at an angle to each other.

Each plane 214 is thus represented by a plurality of vertices, which may be stored as rows of a two dimensional data array as $V_{1,1}, V_{1,2}, V_{1,3}, \ldots V_{i,j}$, where each $V_{i,j}$ represents (x,y,z) coordinates of the point on the plane 214. Subsequent planes 214 may be represented by subsequent rows in the data array.

Operation

Figure 4:
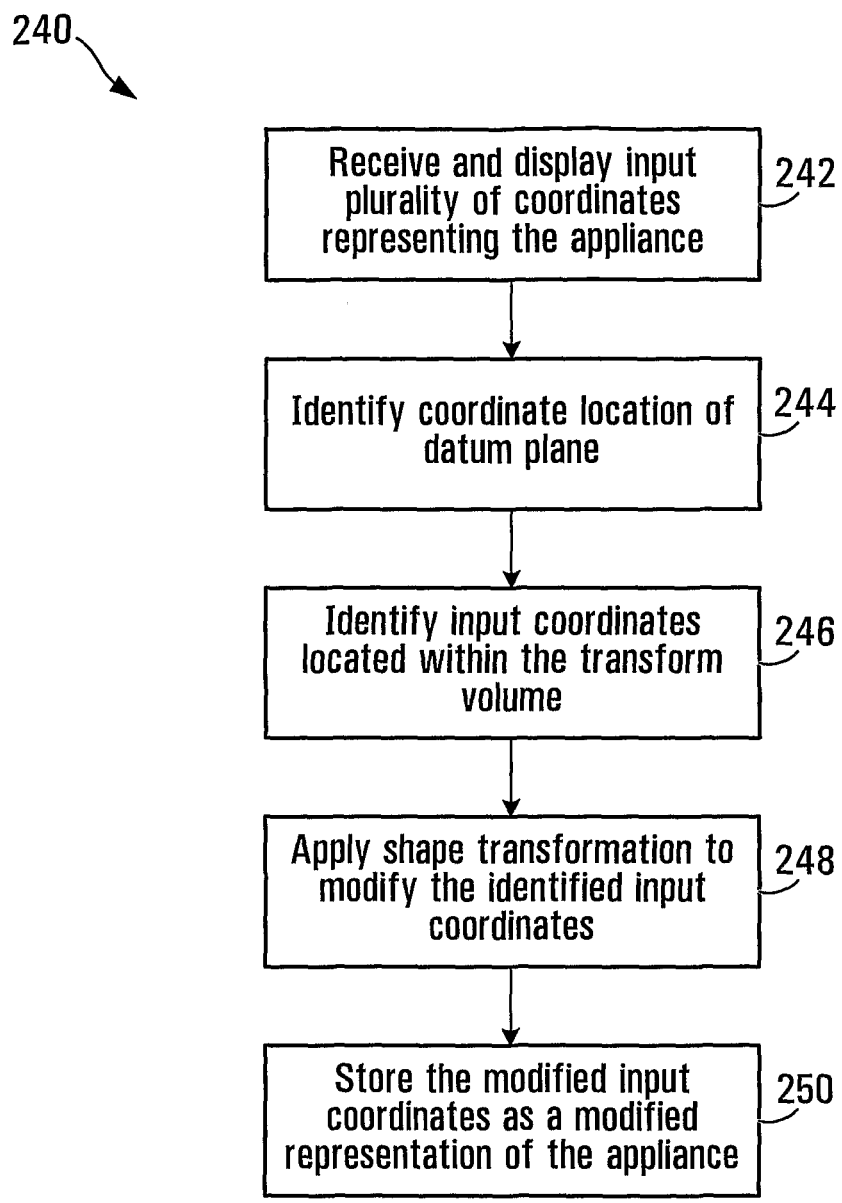
FIG. 4 is a flowchart representing blocks of codes for directing the processor circuit shown in FIG. 2 to apply a shape transformation to the polygon mesh representation shown in FIG. 3.
Figure 5:
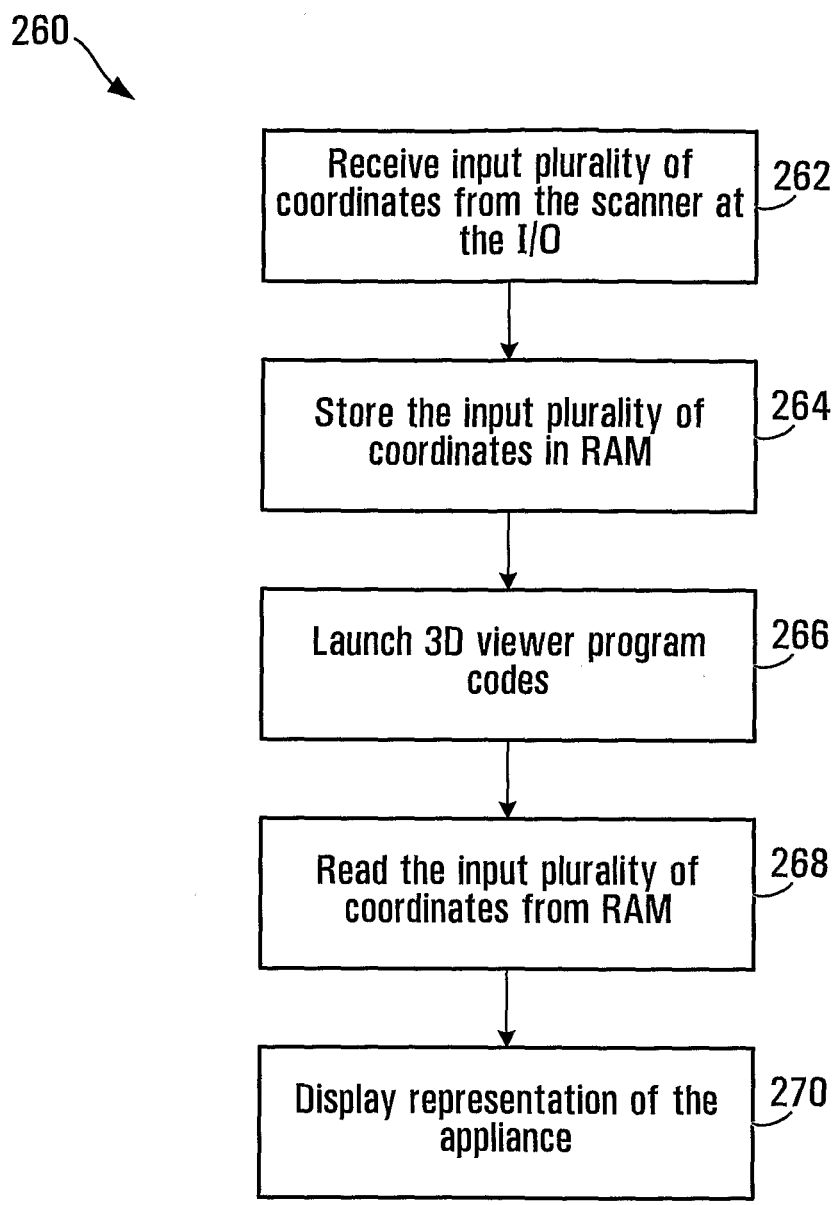
FIG. 5 is a flowchart representing blocks of codes for directing the processor circuit shown in FIG. 2 to receive to receive an input plurality of coordinates representing a general shape of the appliance.

Referring to FIG. 4, a flowchart of blocks of codes for directing the microprocessor 142 (shown in FIG. 2) to apply a shape transformation to the polygon mesh representation 112 of the appliance, is shown generally at 240. The actual code to implement each block may be written in any suitable program language, such as C, and/or C++, for example.

Prior to executing the shape transformation process, block 242 directs the microprocessor 142 to receive an input plurality of coordinates representing a general shape of the appliance.

The shape transformation process begins at block 244, which directs the microprocessor 142 to identify a coordinate location of a datum plane with respect to the representation 112 of the appliance. The datum plane defines a transform volume within which the shape transformation is to be applied. The transform volume extends outwardly from and normal to a first surface of the datum plane.

Block 246 then directs the microprocessor 142 to identify input coordinates in the plurality of input coordinates that are located within the transform volume. Block 248 then directs the microprocessor 142 to modify the input coordinates identified at block 248 in accordance with the shape transformation to produce a modified representation of the appliance.

The process 240 then continues at block 250, which directs the microprocessor 142 to store the modified representation of the appliance in a computer memory (for example the RAM 148).

Advantageously, the process 240 defines a transform volume that facilitates application of shape transforms to only a desired portion of the appliance representation 112, while other portions of the appliance representation may remain unaffected by the shape transformation.

Receiving the Input Plurality of Coordinates

Figure 6:
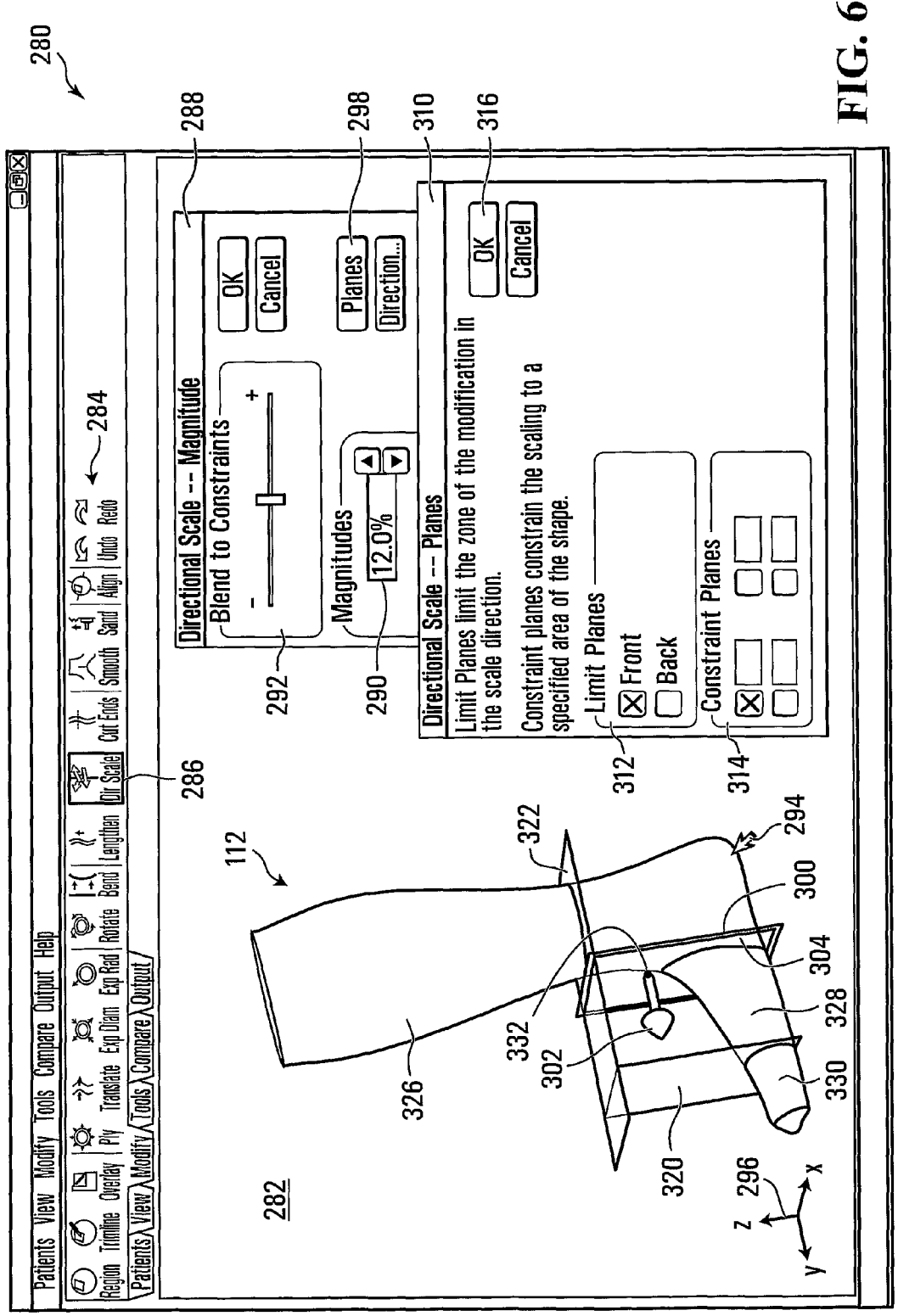
FIG. 6 is a screenshot of a view of the exemplary limb representation shown in FIG. 3.

Block 242 of the process 240 (shown in FIG. 4) is shown in greater detail in FIG. 6. Referring to FIG. 6, a flowchart of blocks of codes for directing the microprocessor 142 (shown in FIG. 2) to receive the input plurality of coordinates representing the general shape of the appliance is shown generally at 260.

The process begins at block 262, which directs the microprocessor 142 to cause the I/O 152 to receive a signal encoded with data defining the input plurality of coordinates at the input 164 of the interface 162. In this embodiment the signal received at the input 164 is produced by the scanner 104. Alternatively, the input of plurality of coordinates may be read from a library of appliance shapes stored on the hard drive 150, or read in by the media reader 154 from a computer readable medium 156.

Block 264 then directs the microprocessor 142 to store the coordinates in the store 180 of the RAM 148. Block 266 then directs the microprocessor 142 to launch the 3D display program codes 174 in the program memory 144, which provide functions for displaying the representation 112 of the appliance.

The process 260 continues at block 268, which directs the microprocessor 142 to read the input plurality of coordinates from the store 180 of the RAM 148. Block 270 then directs the microprocessor 142 to display the appliance representation 112 on the display 110.

In general the 3D display program codes 174 direct the microprocessor 142 to provide functions for viewing the appliance from a perspective point which may be selected in response to user input (received at the pointing device 116 for example), thus facilitating viewing of the body part from a plurality of different angles. The 3D display program codes 174 may also provide functions such as shading of the polygon mesh to provide a more realistic view of the object than is provided by a polygon mesh view, such as that shown in FIG. 3.

Referring to FIG. 4, an exemplary screenshot of a representative view 112 of the limb 108 is shown generally at 280. The view 280 includes a display area 282 for displaying the representation 112 of the limb 108 (or other body part) in a coordinate space indicated by the axes 296. In this embodiment, the representation 112 is displayed as a polygon mesh which is shaded using a Gourand shading algorithm.

The view 280 also includes a control panel 284. The control panel 284 includes various control buttons for manipulating the displayed representation 112, including a button 286 for invoking the shape transformation program codes 176 (shown in FIG. 2). The view 280 also includes a cursor 294, which is interactively positioned on the display are in response to user input received at the pointing device 116 (shown in FIG. 1). The view 280 also includes a pop-up window 288 for receiving user input of shape transformation parameters. In this embodiment the window 288 includes a field 290 for receiving a shape transformation magnitude change, which in this embodiment is a scaling magnitude. The window 288 also includes a slider control 292 for increasing or reducing a size of a blending region, and an activator button for activating a plane definition window, as will be described later herein.

The view 280 also includes a pop-up window 310 for receiving user input for locating planes that further define the extents of the transform volume. The planes pop-up window 310 is displayed in repose to activation of the "Planes" button 298. The window 310 includes a set of checkboxes 312 for activating front and/or back limit planes, a set of checkboxes 314 for activating constraint planes, and an "OK" button 316 for accepting changes and closing the window.

Locating Planes Defining Transform Volume

Figure 7A:
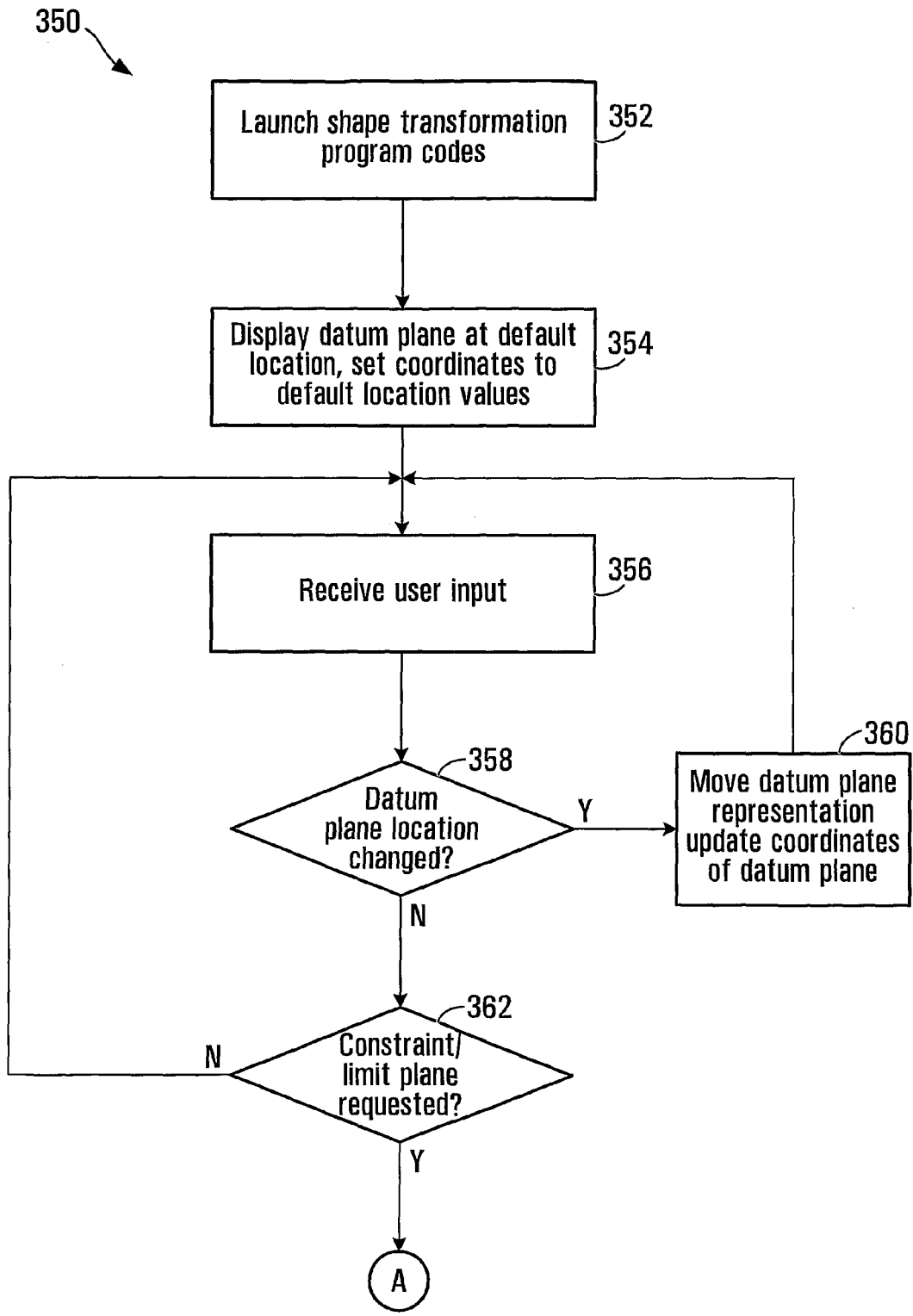
FIG. 7A-7B is a flowchart representation of blocks of codes for directing the processor circuit shown in FIG. 2 to identify a coordinate location of a datum plane.

Block 244 of the process 240 (shown in FIG. 4) is shown in greater detail in FIG. 7. Referring to FIG. 7A, a flowchart of blocks of codes for directing the microprocessor 142 (shown in FIG. 2) to identify the coordinate location of the datum plane is shown generally at 350.

The process begins at block 352 when the button 286 (shown in FIG. 6) is activated by the user, which directs the microprocessor 142 to launch the shape transformation program codes 176 stored in the program memory 144 (shown in FIG. 2).

Block 354 then directs the microprocessor 142 to display a datum plane 300 at a default location and to write coordinates identifying the default location to the store 184 in the RAM 148. Block 356 directs the microprocessor 142 to receive user input, which in this embodiment is received from the pointing device 116 shown in FIG. 2.

The process then continues at block 358, which directs the microprocessor to determine whether the user input represents a desired change to the desired location of the datum plane 300. If the cursor 294 is positioned over the datum plane 300, movements of the pointing device 116 are interpreted as a request to translate the location of the datum plane on the display. The datum plane 300 also includes an arrow 302 normal to a first surface 304 of the datum plane, and the orientation of the datum plane may be changed by when the cursor 294 is positioned over the arrow 302, and the arrow is dragged to cause the datum plane to change orientation (i.e. pitch, roll and yaw). If at block 358 the user input represents a desired change to the location and/or orientation of the datum plane 300, then the process continues at block 360.

Block 360 directs the microprocessor 142 to move the datum plane 300 on the display area 282 in response to the user input, and to write new coordinates identifying the updated location and/or orientation of the datum plane to the store 184 in the RAM 148. The datum plane may be represented by at least three coordinate locations of points lying in the datum plane 300.

While the datum plane 300 is shown in FIG. 4 as having limited extent, the outline shown only represents an active portion of the datum plane selected in accordance with a size of the displayed appliance 112. The datum plane 300 defines the transform volume within which the shape transformation is to be applied. The transform volume extends outwardly from the first surface 304 of the datum plane in the direction of the arrow 302. In the embodiment shown in FIG. 4, a medial portion of a foot and toe area of the appliance representation 112 are both within the transform volume.

If at block 358 the user input does not represent a desired change to the location and/or orientation of the datum plane 300, then the process then continues at block 362. Block 362 directs the microprocessor 142 to determine whether the user input represents a request to display a constraint plane or a limit plane. If the user input does not represent a request to display a constraint plane or a limit plane, then block 362 directs the microprocessor 142 back to block 356.

If at block 362 the user input indicates that the "Planes" button 298 was activated, the block 362 directs the microprocessor 142 to display the planes pop-up window 310. The process then continues at block 372 in FIG. 7B.

Figure 7B:
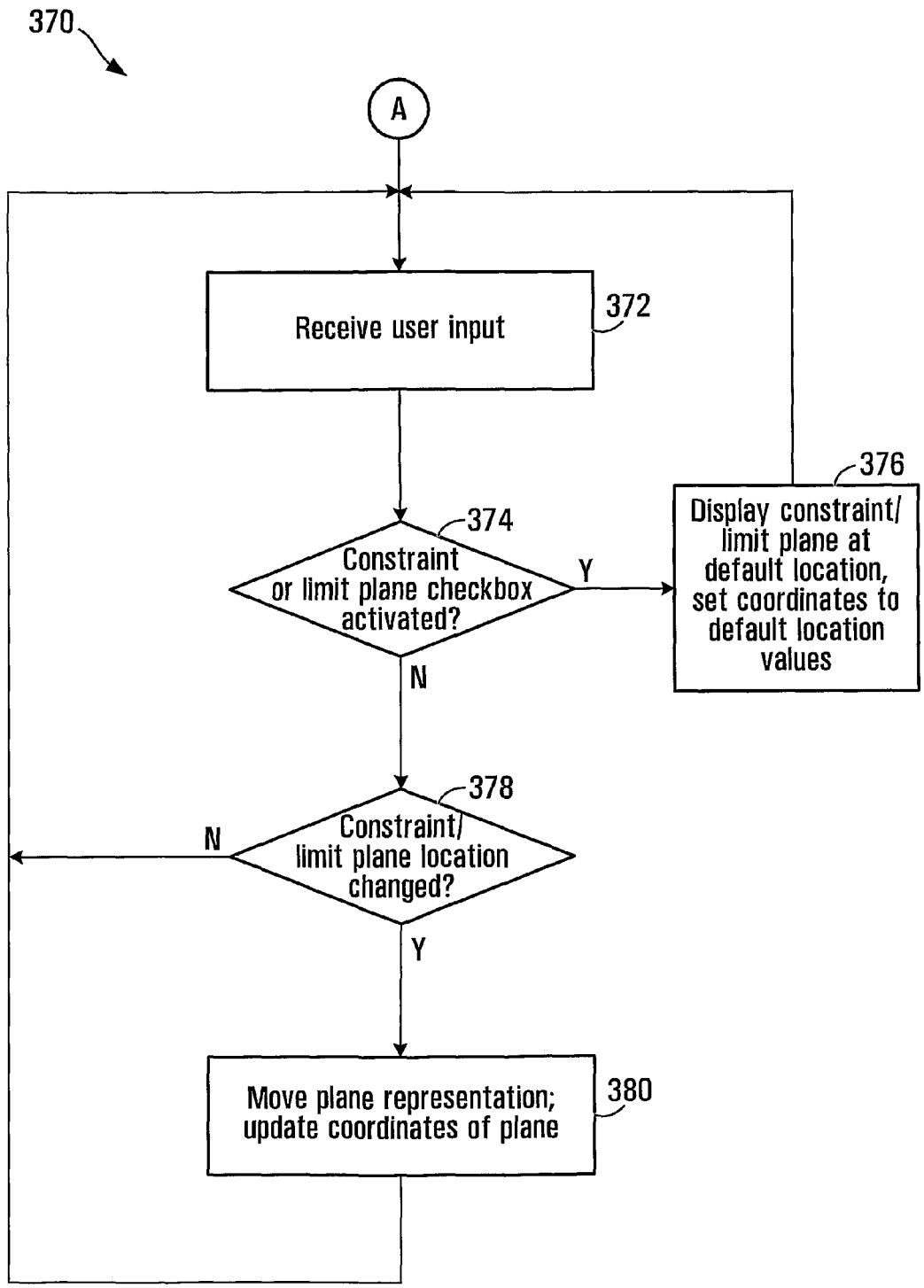

Referring to FIG. 7B, block 372 directs the microprocessor 142 to receive user input from the pointing device 116. Block 374 then directs the microprocessor 142 to determine whether one of the limit plane checkboxes 312 or constraint plane checkboxes 314 have been activated. If one of the checkboxes are activated then the process continues at block 376, which directs the microprocessor 142 to display the appropriate constraint or limit plane at a default location and to write coordinates identifying the default location to the respective store 186 or 188 in the RAM 148.

Referring back to FIG. 6, in the embodiment shown, a "front" limit plane checkbox 312 is activated which causes a limit plane 320 to be displayed. One of the constraint checkboxes 314 is also checked, which causes a constraint plane 322 to be displayed.

Referring again to FIG. 7B, if at block 374 no checkbox is activated, then the process continues at block 378, which directs the microprocessor 142 to determine whether a location of a displayed constraint or limit plane should be changed in response to the user input. If a location of one of the planes is to be changed then the process continues at block 380, which directs the microprocessor 142 to move the appropriate plane and to write new coordinates to the respective store 186 or 188 in the RAM 148. Block 380 then directs the microprocessor 142 back to block 372.

If at block 378, the user input does not represent a desired location change of plane location, then block 378 directs the microprocessor 142 back to block 372.

In general constraint planes and limit planes limit the extent of the transform volume, within which the shape transformation is to be applied. Constraint planes, such as the constraint plane 322, are perpendicular to the datum plane 300. In this embodiment up to four orthogonally oriented constraint planes may be activated and displayed by selecting the checkboxes 314. Each of the four constraint planes may be used to limit the extent of the transform volume in the respective orthogonal directions in which the respective constraint planes are oriented.

In the embodiment shown, the constraint plane 322 limits the transform volume such that a portion 326 of the representation 112 is outside the transform volume and is thus not modified by any shape transformation applied to the transform volume. A second portion 328 of the representation 112 is inside the transform volume and is modified by any applied shape transformations.

In this embodiment, a forward transform volume in the direction of the arrow 302 is active, and shape transformations are performed in a "forward direction". However, a reverse transform volume in an opposite direction to the arrow 302 may also be activated for shape transformation. Limit planes, such as the limit plane 320 are defined in either forward transform volume (i.e. the "front" checkbox 312 is activated), or in the reverse transform volume, in which case the "back" checkbox is activated.

The limit plane 320 intersects the representation 112 and limits the extent of the transform volume to a region between the limit plane 320, the constraint plane 322, and the datum plane. In the embodiment shown, the transform volume still extends without limit in a downward direction and directions into and out of the drawing page, as constraint planes are not activated in these directions.

The limit plane 320 also demarcates a third portion 330 of the representation 112 from the second portion 328 of the representation. Input coordinates representing the third portion 330 of the representation 112 located beyond the limit plane 320 are outside the transform volume and the shape transformation is not applied to these coordinates. However since the shape transformation generally causes the second portion 328 to be altered in shape, after transformation, the third portion 330 requires translation in a direction normal to the datum plane 300. The translation causes the second portion 328 and the third portion 330 of the representation 112 on either side of said limit plane to remain contiguously located after being modified by the shape transformation.

Once constraint and limit planes have been located as desired, the window 310 may be closed by activating the "OK" button 316.

Identifying Input Coordinates in the Transform Volume

Figure 8:
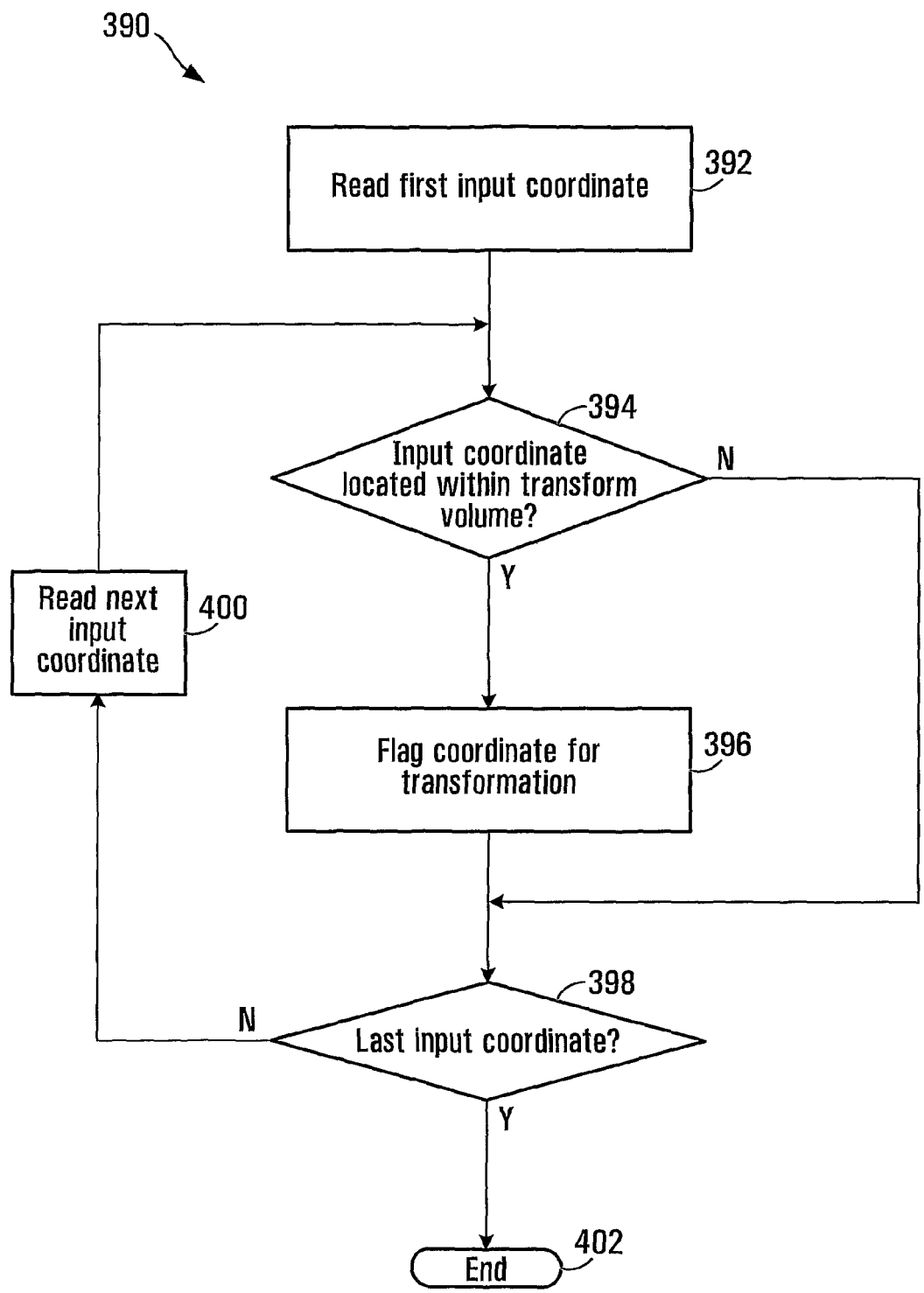
FIG. 8 is a flowchart representing blocks of codes for directing the processor circuit shown in FIG. 2 to execute a process to identify input coordinates in the plurality of input coordinates that are located within a transform volume.

Block 246 of the process 240 (shown in FIG. 4) is shown in greater detail in FIG. 8. Referring to FIG. 8, a flowchart of blocks of codes for directing the microprocessor 142 (shown in FIG. 2) to identify input coordinates in the plurality of input coordinates that are located within the transform volume is shown generally at 390.

The process 390 is launched when user input is received changing the shape transformation magnitude in the field 290. Block 392 directs the microprocessor 142 to read a first input coordinate from the store 180 in the RAM 148. Block 394 then directs the microprocessor 142 to determine whether the input coordinate read from the store 180 is located within the defined transform volume, in which case the process continues at block 396.

Block 396 directs the microprocessor 142 to flag the input coordinate by writing a "1" to the Boolean array of flags in the store 183 of the RAM 148. The process then continues at block 398.

If at block 394, the input coordinate is not located in the transform volume then block 394 directs the microprocessor 142 to block 398.

Block 398 directs the microprocessor 142 to determine whether the input coordinate was the last input coordinate. If not, then the process continues at block 400, which directs the microprocessor 142 to read the next input coordinate from the store 180 of the RAM 148. Block 400 then directs the microprocessor 142 back to block 394.

If at block 398 the input coordinate is the last input coordinate, then the process ends at 402. Once the process 390 has completed, elements set to Boolean "1" in the coordinate flag array in the store 183 identify corresponding coordinates in the store 180, as being located within the transform volume.

Modifying Identified Input Coordinates

Figure 9:
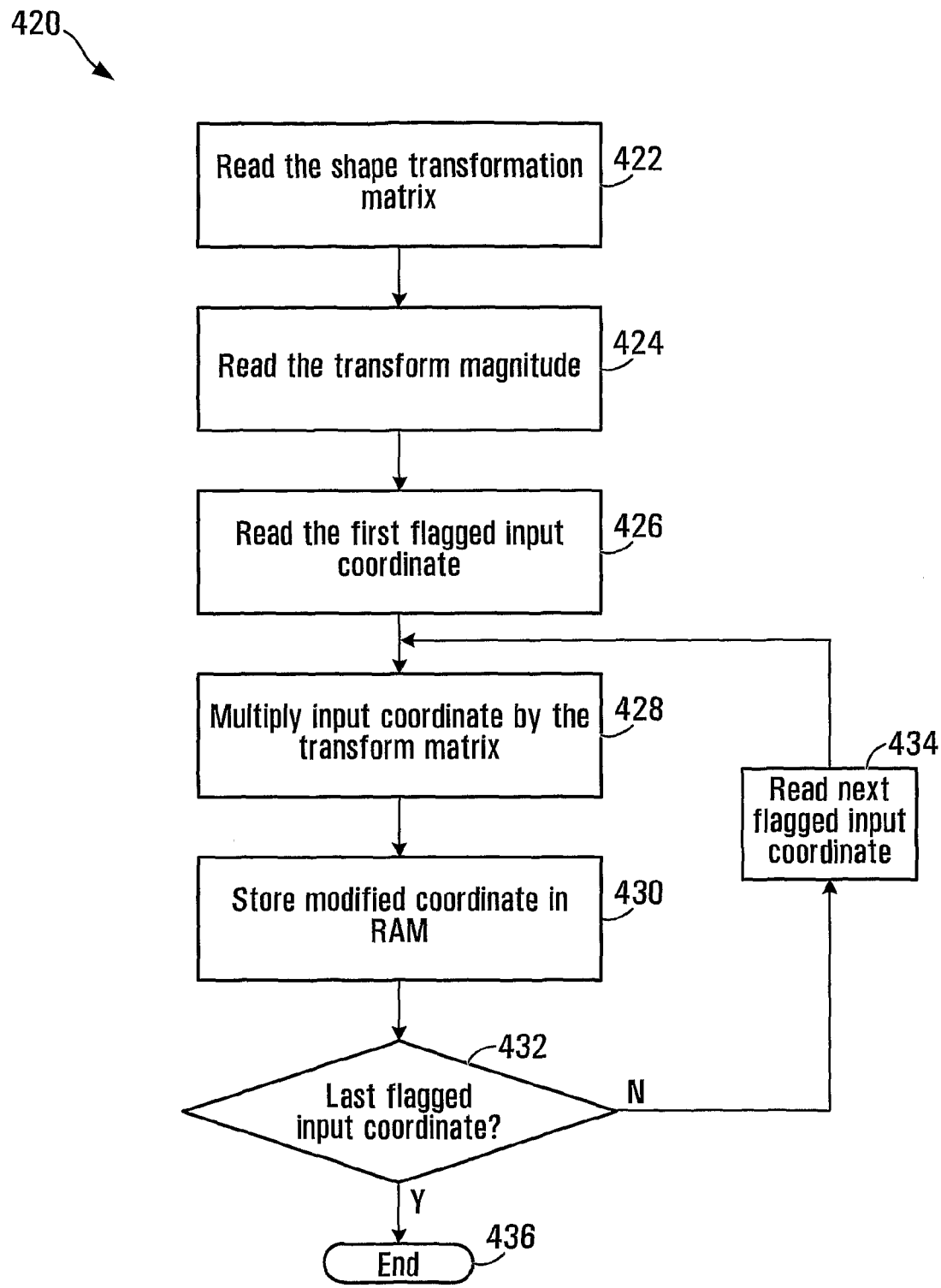
FIG. 9 is a flowchart representing blocks of codes for directing the processor circuit shown in FIG. 2 to modify the identified input coordinates in accordance with a shape transformation.

Block 248 of the process 240 (shown in FIG. 4) is shown in greater detail in FIG. 9. Referring to FIG. 9, a flowchart of blocks of codes for directing the microprocessor 142 (shown in FIG. 2) to modify the identified input coordinates in accordance with the shape transformation is shown generally at 420.

The process 420 is launched after the process 390 has identified input coordinates located in the transform volume. The process begins at block 422, which directs the microprocessor 142 to read the transform matrix from the store 190 in the RAM 148.

In this embodiment the transformation matrix has the following form:

$$M = \begin{bmatrix} a_{11} & a_{12} & a_{13} & 0 \\ a_{21} & a_{22} & a_{23} & 0 \\ a_{31} & a_{32} & a_{33} & 0 \\ T_x & T_y & T_z & 1 \end{bmatrix},$$ Eqn 1 and input coordinates may be represented in homogenous coordinates by the vector:

$$\overline{P}[xyz1].$$ Eqn 2

Modified output coordinates $\overline{P}'$ my then be produced by multiplying the input coordinates $\overline{P}$ by the transformation matrix M:

$$\overline{P}' = \overline{P}M$$ Eqn 3

The transformation matrix M is often represented in segmented form as:

$$M = \begin{bmatrix} [A] & [0] \\ [T] & [1] \end{bmatrix},$$ Eqn 4 where A is a 3×3 matrix having elements that represent combined effects of scaling, rotation, and shear transformations, T is a 3×1 vector having elements that represent translations of the input coordinate of the input, 0 is a 1×3 vector having zero value elements, and 1 is a 1×1 matrix having a single unity element.

For example, a rotation θ about the z-axis:

$$A = \begin{bmatrix} \cos\theta & \sin\theta & 0 \\ -\sin\theta & \cos\theta & 0 \\ 0 & 0 & 1 \end{bmatrix},$$

for a uniform scale in all directions:

$$A = \begin{bmatrix} s & 0 & 0 \\ 0 & s & 0 \\ 0 & 0 & s \end{bmatrix},$$

where s is a scale factor, and for a non-uniform scale in the x-axis direction:

$$A = \begin{bmatrix} s & 0 & 0 \\ 0 & 1 & 0 \\ 0 & 0 & 1 \end{bmatrix}.$$

The above examples all result in shape transformations with respect to the axes x, y, or z, which would require that the datum plane be aligned with one of the axes. Referring back to FIG. 6, for a scaling transformation with respect to an arbitrarily oriented datum plane 300 a point Q (332) that lies on the datum plane is selected and a unit vector $\overline{U}$ that is normal to the datum plane is defined (i.e. a unit vector in the direction of the arrow 302), and the matrix A may then be written as:

$$A = I - (1-s)(\overline{U} \otimes \overline{U}),$$ Eqn 5 where I is a 3×3 identity matrix, $\overline{U} \otimes \overline{U}$ is a tensor product of the unit vector $\overline{U}$ with itself, and s is a scaling factor having a scalar value representing a desired scale (i.e. when s=1 there is no scaling of the input coordinates). The corresponding translation vector T may be written as:

$$T = (1-s)(Q\overline{U})\overline{U}$$ Eqn 6

By substituting A obtained from equation 5 and T obtained from equation 6 into equation 4, a transform matrix M is obtained that may be used to perform non-uniform scaling in a direction normal to the arbitrarily located datum plane 300. The elements of the matrix M are stored in the RAM 148.

Referring back to FIG. 9, the process 420 then continues at block 424, which directs the microprocessor 142 to read the transform magnitude. The transform magnitude is received in response to user input received at field 290 of the window 288, and stored in the store 190 of the RAM 148.

Block 426 then directs the microprocessor 142 to read the first flagged input coordinate from the store 180 (i.e. a coordinate that has a corresponding flag set in the store 183 in the RAM 148).

Block 428 then directs the microprocessor 142 to multiply the input coordinate by the transform matrix M to produce a first modified coordinate. Block 430 then directs the microprocessor 142 to store the modified coordinate as an output coordinate in the store 182 of the RAM 148.

The process then continues at block 432, which directs the microprocessor 142 to determine whether the input coordinate is the last flagged input coordinate in the store 180 of the RAM 148. If the input coordinate is not the last flagged coordinate then the process continues at block 434, which directs the microprocessor 142 to read the next flagged input coordinate from the store 180. Block 434 then directs the microprocessor 142 back to block 428.

If the input coordinate is the last flagged coordinate then the process ends at block 436.

The process 420 by using the transform matrix M defined in equations 4, 5, and 6, thus performs a shape transformation on the transform volume defined by the datum plane 300, the limit plane 320, and the constraint plane 322. If s in Eqn 5 and 6 is greater than unity, then the second portion 328 of the representation 112 is enlarged in the direction of the arrow 302, and the third portion 330 is translated in the direction of the arrow 302. If s in Eqn 5 and 6 is less than unity, then the second portion 328 of the representation 112 is reduced in size, and the third portion 330 is translated in a direction opposite to the arrow 302.

Blending

Figure 10:
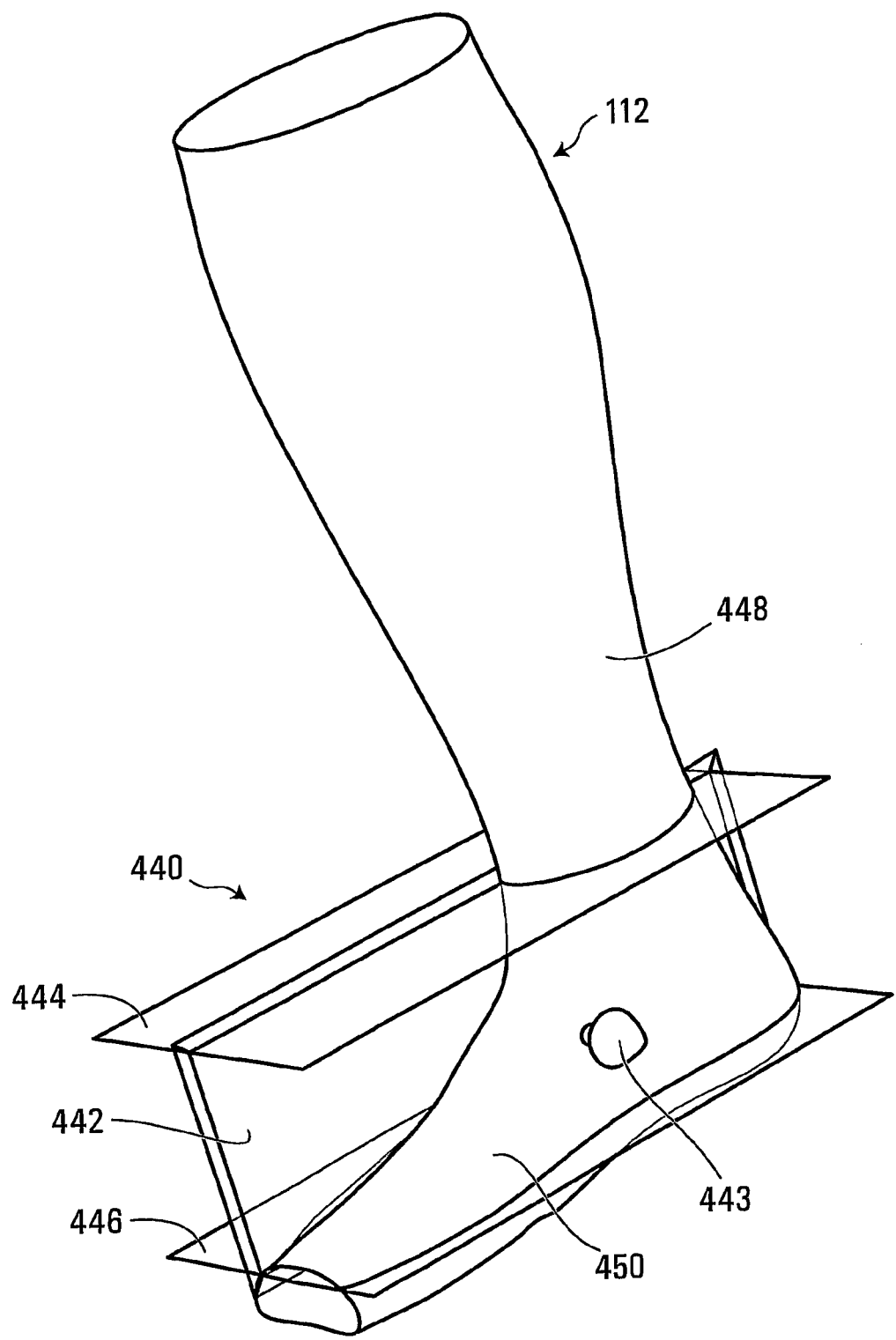
FIG. 10 is a screenshot of a view of a portion of the exemplary limb representation shown in FIG. 3 and FIG. 6.

Referring to FIG. 10, an alternate exemplary embodiment of the representation 112 is shown generally at 440, in which a datum plane 442 is shown in a different orientation to that shown in FIG. 6. In this embodiment the transform volume is defined in the direction of an arrow 443, which is generally directed in lateral direction with respect to the representation 112. A first constraint plane 444 and a second constraint plane 446 are also activated. Any shape transformation that may be applied within the transform volume may thus result in a discontinuity between an unmodified portion 448, and a modified portion 450 of the representation 112.

Figure 11:
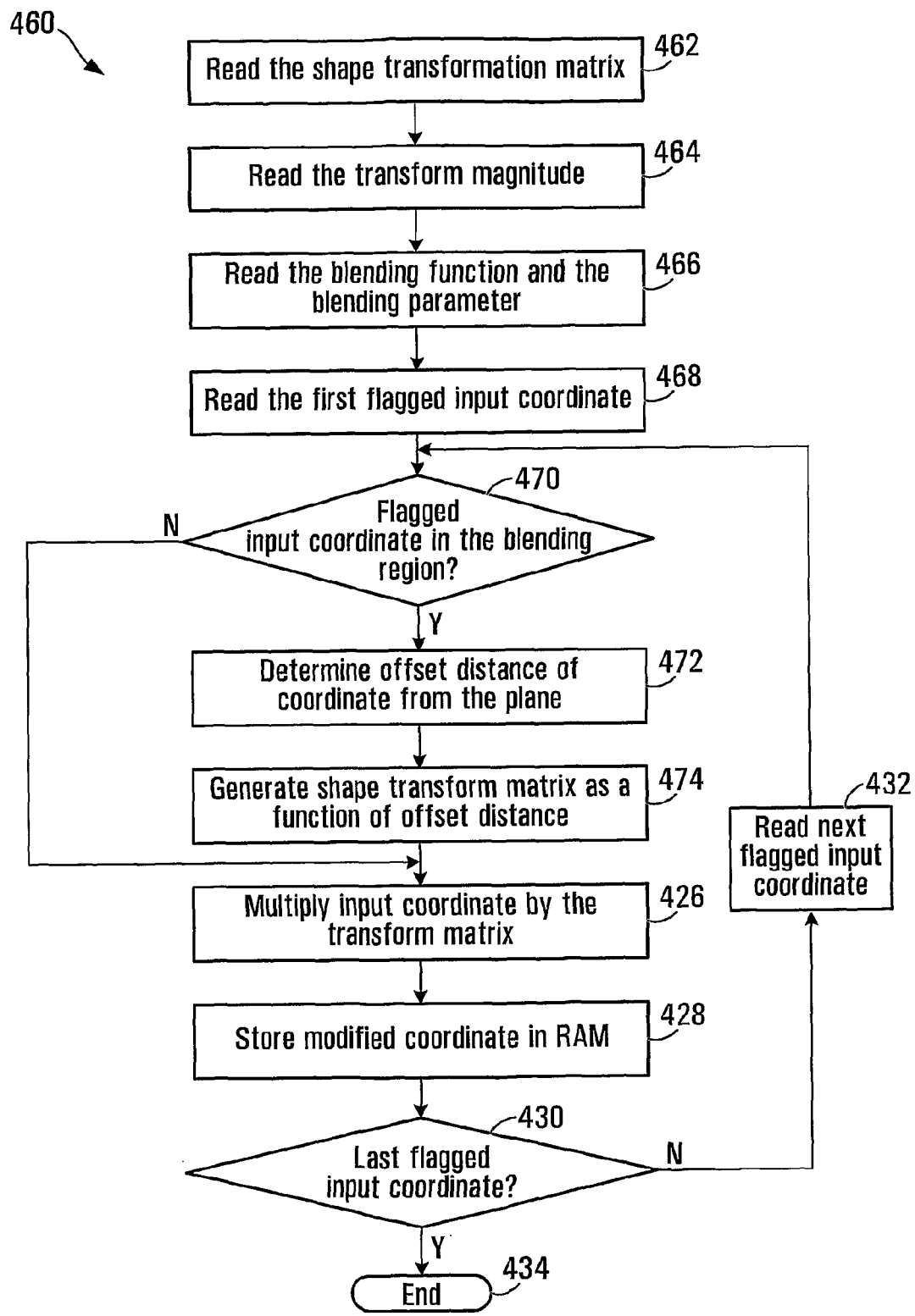
FIG. 11 is a flowchart representing blocks of codes for directing the processor circuit shown in FIG. 2 to modify the identified input coordinates in accordance an alternative embodiment of the invention.

Referring to FIG. 11, a flowchart of blocks of codes for directing the microprocessor 142 (shown in FIG. 2) to modify the identified input coordinates in accordance an alternative embodiment is shown generally at 460. The process 460 has several steps in common with the process 420 shown in FIG. 9, but additionally provides for blending at the constraint planes.

The process 460 begins at 462, which directs the microprocessor 142 to read the transform matrix from the store 190 in the RAM 148. Block 464 then directs the microprocessor 142 to read the transform magnitude. The transform magnitude is received in response to user input received at field 290 of the window 288, and stored in the store 190 of the RAM 148.

Block 466 then directs the microprocessor 142 to read the blending function from the store 192 of the RAM 148. In general blending is applied to alter a shape transform magnitude in the blending region to cause continuity of shape between the modified portion 450 and the unmodified portion 448. The blending slider control 292 (shown in FIG. 6) facilitates user control over an extent of the blending region. When the slider control 292 is dragged in the positive direction, the blending region extends further into the transform volume from the constraint planes. Similarly, when the slider control 292 is dragged in the negative direction, the blending region extent into the transform volume is reduced.

A blending function G(P) is used to modify the scaling factor s to produce a modified scaling factor s' as follows:

$$s' = 1 + (s-1)G(P) \qquad \text{Eqn 7}$$

In one embodiment the blending function G(P) is implemented using the cubic polynomial:

$$G(P) = 3\left(\frac{h}{h_c}\right)^2 - 2\left(\frac{h}{h_c}\right)^3, \qquad \text{Eqn 8}$$

where h is the offset distance between the applicable constraint plane and the point P, and $h_c$ is the blending parameter which is set in response to user input received via the slider control 292. For equation 8, when h=0 (i.e. at the constraint plane), G(P)=zero and when h=$h_c$ G(P)=1. Accordingly, at location in the transform volume beyond h=$h_c$, s'=s, and thus blending is discontinued.

In an alternative embodiment, the blending function may be implemented using a bi beta function which forces a surface derivative at h=0 and h=$h_c$ to be zero.

Still referring to FIG. 11, block 466 directs the microprocessor 142 to read the slider control 292, and to write the desired value of the blending parameter $h_c$ into the store 192 of the RAM 148.

Block 468 then directs the microprocessor 142 to read the first flagged input coordinate from the store 180 (i.e. a coordinate that has a corresponding flag set in the store 183 in the RAM 148).

Block 470 then directs the microprocessor 142 to determine whether the flagged input coordinate is in the blending region specified by the blending parameter $h_c$, in which case the process continues at block 482. Block 482 directs the microprocessor 142 to determine the offset distance of the coordinate from the respective datum, limit, or constraint plane.

Block 484 then directs the microprocessor 142 to calculate the value of s' from equations 7 and 8, and to generate the transform matrix using equations 4-6 using the s' scale factor. The process then continues at blocks 428-436 as described above in connection with FIG. 9 using the transform matrix generated at block 484 to transform the input coordinates resulting in a blended transition between the modified portion 450 and the unmodified portions 448 of the representation 112.

If at block 470, the flagged input coordinate is not in the blending region specified by the blending parameter $h_c$, then the process continues at blocks 428-436 as described above in connection with FIG. 9 using the transform matrix read at block 462 to transform the input coordinates.

Advantageously, the above processes and apparatus facilitate definition of an arbitrary direction for applying a shape transformation to a 3D representation by defining a transform volume. Furthermore, by facilitating limits and/or constraints to the transform volume, the shape transformation may be applied to only desired portions of the representation.

While specific embodiments of the invention have been described and illustrated, such embodiments should be considered illustrative of the invention only and not as limiting the invention as construed in accordance with the accompanying claims.

What is claimed is:

1. A method for applying a shape transformation to at least a portion of a three dimensional representation of an appliance for a living body, the representation being defined by an input plurality of coordinates representing a general shape of the appliance, the method comprising:
   identifying a location of a datum plane with respect to the representation of the appliance, said datum plane defining a transform volume within which the shape transformation is to be applied, said transform volume extending outwardly from said datum plane in a normal direction to a first surface of said datum plane, said normal direction defining a direction for applying said shape transformation;
   identifying input coordinates in the plurality of input coordinates that are located within said transform volume;
   identifying a location of at least one constraint plane, said at least one constraint plane being perpendicular to said datum plane and operable to limit an extent of said transform volume in a direction normal to said constraint plane;
   identifying a blending region in said transform volume proximate said constraint plane;
   modifying said identified input coordinates in accordance with the shape transformation to produce a modified representation of the appliance, wherein identifying said location of said constraint plane comprises identifying a coordinate location to cause said constraint plane to intersect the representation of the appliance such that said modified representation of the appliance includes a modified portion within the transform volume and an unmodified portion outside the transform volume;
   altering a shape transform magnitude in said blending region to cause continuity of shape between said modified portion and said unmodified portion of the modified representation of the appliance;
   wherein modifying said identified input coordinates in accordance with the shape transformation comprises scaling said identified input coordinates in a direction normal to said first surface of said datum plane and wherein altering said shape transform magnitude comprises applying a plurality of different scaling magnitudes to identified input coordinates in the blending region such that input coordinates in the blending region located proximate the constraint plane are scaled less than input coordinates in the blending region that are located distal to the constraint plane;

displaying the representation of the appliance and the datum plane on a computer display; and storing said modified representation of the appliance in a computer memory.

2. The method of claim 1 wherein identifying said location of said datum plane comprises identifying a coordinate location that causes said datum plane to intersect the representation of the appliance such that said modified representation of the appliance includes a modified portion within the transform volume, and an unmodified portion outside the transform volume.

3. The method of claim 2 wherein modifying said identified input coordinates in accordance with the shape transformation comprises scaling said identified input coordinates in a direction normal to said first surface of said datum plane.

4. The method of claim 1 wherein identifying said location of said at least one constraint plane comprises identifying respective locations of at least two constraint planes, each respective constraint plane being perpendicular to said datum plane, the respective constraint planes being orthogonally located with respect to each other.

5. The method of claim 1 further comprising identifying a location of a limit plane, said limit plane being located in said transform volume and being parallel to said datum plane, said limit plane being operable to limit an extent of said transform volume in a direction normal to said datum plane.

6. The method of claim 5 wherein identifying said location of said limit plane comprises identifying a coordinate location to cause said limit plane to intersect the representation of the appliance such that said modified representation of the appliance includes a modified portion within the transform volume, and an unmodified portion outside the transform volume, and further comprising:

identifying input coordinates in the plurality of input coordinates representing portions of the appliance located beyond said limit plane; and causing said identified input coordinates to be translated in a direction normal to the datum plane such that said modified portion of said representation and said unmodified portion of said representation of the appliance on either side of said limit plane remain contiguously located after said modifying.

7. The method of claim 1 wherein identifying said location of said datum plane comprises identifying a coordinate location of said datum plane in response to receiving first user input.

8. The method of claim 1 further comprising interactively repositioning said datum plane on said computer display in response to receiving second user input representing a desired change in said coordinate location of said datum plane.

9. The method of claim 1 wherein modifying said identified input coordinates comprises:

generating a transform matrix representing said shape transform; and multiplying each identified input coordinate by said transform matrix to produce modified input coordinates representing said modified representation of the appliance.

10. The method of claim 1 further comprising receiving said input plurality of coordinates.

11. The method of claim 1 further comprising transforming said modified representation of the appliance into a set of instructions operable to control a computer aided manufacturing machine to produce the appliance.

12. An apparatus for applying a shape transformation to at least a portion of a three dimensional representation of an appliance for a living body, the representation being defined by an input plurality of coordinates representing a general shape of the appliance, the apparatus comprising:

means for identifying a coordinate location of a datum plane with respect to the representation of the appliance, said datum plane defining a transform volume within which the shape transformation is to be applied, said transform volume extending outwardly from said datum plane in a normal direction to a first surface of said datum plane, said normal direction defining a direction for applying said shape transformation;

means for identifying input coordinates in the plurality of input coordinates that are located within said transform volume;

means for identifying a location of at least one constraint plane, said at least one constraint plane being perpendicular to said datum plane and operable to limit an extent of said transform volume in a direction normal to said constraint plane;

means for identifying a blending region in said transform volume proximate said constraint plane;

means for modifying said identified input coordinates in accordance with the shape transformation to produce a modified representation of the appliance, wherein said means for identifying said location of said constraint plane comprises means for identifying a coordinate location to cause said constraint plane to intersect the representation of the appliance such that said modified representation of the appliance includes a modified portion within the transform volume and an unmodified portion outside the transform volume;

means for altering a shape transform magnitude in said blending region to cause continuity of shape between said modified portion and said unmodified portion of the modified representation of the appliance;

wherein said means for modifying said identified input coordinates in accordance with the shape transformation comprises means for scaling said identified input coordinates in a direction normal to said first surface of said datum plane and wherein said means for altering said shape transform magnitude comprises means for applying a plurality of different scaling magnitudes to identified input coordinates in the blending region such that input coordinates in the blending region located proximate the constraint plane are scaled less than input coordinates in the blending region that are located distal to the constraint plane; and means for storing said modified representation of the appliance in a computer memory.

13. The apparatus of claim 12 further comprising means for identifying a location of a limit plane, said limit plane being located in said transform volume and being parallel to said datum plane, said limit plane being operable to limit an extent of said transform volume in a direction normal to said datum plane.

14. The apparatus of claim 12 further comprising means for receiving said input plurality of coordinates.

15. The apparatus of claim 12 further comprising means for transforming said modified representation of the appliance into a set of instructions operable to control a computer aided manufacturing machine to produce the appliance.

16. An apparatus for applying a shape transformation to at least a portion of a three dimensional representation of an appliance for a living body, the representation being defined by an input plurality of coordinates representing a general shape of the appliance, the apparatus comprising a processor circuit operably configured to:

identify a coordinate location of a datum plane with respect to the representation of the appliance, said datum plane defining a transform volume within which the shape transformation is to be applied, said transform volume extending outwardly from said datum plane in a normal direction to a first surface of said datum plane said normal direction defining a direction for applying said shape transformation;

identify input coordinates in the plurality of input coordinates that are located within said transform volume;

identify a location of at least one constraint plane, said at least one constraint plane being perpendicular to said datum plane and operable to limit an extent of said transform volume in a direction normal to said constraint plane;

identify a blending region in said transform volume proximate said constraint plane;

modify said identified input coordinates in accordance with the shape transformation to produce a modified representation of the appliance, said processor circuit being operably configured to identify said location of said constraint plane by identifying a coordinate location to cause said constraint plane to intersect the representation of the appliance such that said modified representation of the appliance includes a modified portion within the transform volume and an unmodified portion outside the transform volume;

alter a shape transform magnitude in said blending region to cause continuity of shape between said modified portion and said unmodified portion of the modified representation of the appliance, wherein said processor circuit is operably configured to modify said identified input coordinates in accordance with the shape transformation by scaling said identified input coordinates in a direction normal to said first surface of said datum plane and wherein said processor circuit is operably configured to alter said transform magnitude in said blending region by applying a plurality of different scaling magnitudes to identified input coordinates in the blending region such that input coordinates in the blending region located proximate the constraint plane are scaled less than input coordinates in the blending region that are located distal to the constraint plane; and store said modified representation of the appliance in a computer memory.

17. The apparatus of claim 16 wherein said processor circuit is operably configured to identify a coordinate location that causes said datum plane to intersect the representation of the appliance such that said modified representation of the appliance includes a modified portion within the transform volume, and an unmodified portion outside the transform volume.

18. The apparatus of claim 16 wherein said processor circuit is operably configured to modify said identified input coordinates in accordance with the shape transformation by scaling said identified input coordinates in a direction normal to said first surface of said datum plane.

19. The apparatus of claim 16 wherein said processor circuit is operably configured to identify said location of said at least one constraint plane comprises by identifying respective locations of at least two constraint planes, each respective constraint plane being perpendicular to said datum plane, the respective constraint planes being orthogonally located with respect to each other.

20. The apparatus of claim 16 wherein said processor circuit is operably configured to identify a location of a limit plane, said limit plane being located in said transform volume and being parallel to said datum plane, said limit plane being operable to limit an extent of said transform volume in a direction normal to said datum plane.

21. The apparatus of claim 20 wherein said processor circuit is operably configured to identify said coordinate location of said limit plane by identifying a coordinate location to cause said limit plane to intersect the representation of the appliance such that said modified representation of the appliance includes a modified portion within the transform volume and an unmodified portion outside the transform volume, and wherein said processor circuit is further operably configured to:

identify input coordinates in the plurality of input coordinates representing portions of the appliance located beyond said limit plane; and cause said identified input coordinates to be translated in a direction normal to the datum plane such that said modified portion of said representation and said unmodified portion of said representation of the appliance on either side of said limit plane remain contiguously located after said modifying.

22. The apparatus of claim 16 wherein said processor circuit is operably configured to identify said coordinate location of said datum plane by identifying said coordinate location of said datum plane in response to receiving first user input.

23. The apparatus of claim 22 wherein said processor circuit is operably configured to display the representation of the appliance and the datum plane.

24. The apparatus of claim 23 wherein said processor circuit is operably configured to interactively reposition said datum plane on said means for displaying in response to receiving second user input representing a desired change in said coordinate location of said datum plane.

25. The apparatus of claim 16 wherein said processor circuit is operably configured to modify said identified input coordinates by:

generating a transform matrix representing said shape transform; and multiplying each identified input coordinate by said transform matrix to produce modified input coordinates representing said modified representation of the appliance.

26. The apparatus of claim 16 wherein said processor circuit is operably configured to receive said input plurality of coordinates.

27. The apparatus of claim 16 wherein said processor circuit is operably configured to transform said modified representation of the appliance into a set of instructions operable to control a computer aided manufacturing machine to produce the appliance.

28. A non-transitory computer readable medium encoded with codes for directing a processor circuit to apply a shape transformation to at least a portion of a three dimensional representation of an appliance for a living body, the representation being defined by an input plurality of coordinates representing a general shape of the appliance, the codes directing the processor circuit to:

identify a coordinate location of a datum plane with respect to the representation of the appliance, said datum plane defining a transform volume within which the shape transformation is to be applied, said transform volume extending outwardly from said datum plane in a normal direction to a first surface of said datum plane, said normal direction defining a direction for applying said shape transformation;

identify input coordinates in the plurality of input coordinates that are located within said transform volume;

identify a location of at least one constraint plane, said at least one constraint plane being perpendicular to said datum plane and operable to limit an extent of said transform volume in a direction normal to said constraint plane;

identify a blending region in said transform volume proximate said constraint plane;

modify said identified input coordinates in accordance with the shape transformation to produce a modified representation of the appliance, said processor circuit being operably configured to identify said location of said constraint plane by identifying a coordinate location to cause said constraint plane to intersect the representation of the appliance such that said modified representation of the appliance includes a modified portion within the transform volume and an unmodified portion outside the transform volume;

alter a shape transform magnitude in said blending region to cause continuity of shape between said modified portion and said unmodified portion of the modified representation of the appliance, wherein said processor circuit is operably configured to modify said identified input coordinates in accordance with the shape transformation by scaling said identified input coordinates in a direction normal to said first surface of said datum plane and wherein said processor circuit is operably configured to alter said transform magnitude in said blending region by applying a plurality of different scaling magnitudes to identified input coordinates in the blending region such that input coordinates in the blending region located proximate the constraint plane are scaled less than input coordinates in the blending region that are located distal to the constraint plane; and store said modified representation of the appliance in a computer memory.

* * * * *